(12) United States Patent
White et al.

(10) Patent No.: US 8,977,861 B2
(45) Date of Patent: *Mar. 10, 2015

(54) METHOD AND SYSTEM FOR BIOMETRIC AUTHENTICATION

(75) Inventors: Conor Robert White, Vienna, VA (US); Michael Peirce, Dublin (IE); Gaurav Gupta, Bangalore (IN)

(73) Assignee: Daon Holdings Limited, George Town (KY)

( * ) Notice: Subject to any disclaimer, the term of this patent is extended or adjusted under 35 U.S.C. 154(b) by 666 days.

This patent is subject to a terminal disclaimer.

(21) Appl. No.: 13/233,243

(22) Filed: Sep. 15, 2011

(65) Prior Publication Data

US 2012/0042171 A1 Feb. 16, 2012

Related U.S. Application Data

(63) Continuation of application No. 12/857,337, filed on Aug. 16, 2010, now Pat. No. 8,041,956.

(51) Int. Cl.
*H04L 29/06* (2006.01)
*G06F 21/32* (2013.01)
(Continued)

(52) U.S. Cl.
CPC ............ *H04L 63/0861* (2013.01); *G06F 21/32* (2013.01); *G06F 2221/2115* (2013.01); *G06F 2221/2117* (2013.01); *G06K 9/00073* (2013.01); *G06K 9/00093* (2013.01); *G06K 9/72* (2013.01)
USPC .............................................. 713/186; 726/7

(58) Field of Classification Search
CPC ............ G06F 21/32; G06F 2221/2115; G06F 2221/2117; H04L 9/0866; H04L 9/3231; H04L 63/0861; G06K 9/00073; G06K 9/00093; G06K 9/72
USPC .............................................. 713/186; 726/7
See application file for complete search history.

(56) References Cited

U.S. PATENT DOCUMENTS 3,959,884 A * 6/1976 Jordan et al. ..................... 283/69
4,015,240 A * 3/1977 Swonger et al. ............... 382/125
(Continued)

FOREIGN PATENT DOCUMENTS

EP 2 073 147 A1 6/2009
FR 2 917 525 12/2008
(Continued)

OTHER PUBLICATIONS

"A secure fingerprint matching technique," Yang et al., Proceedings of the 2003 ACM SIGMM workshop on Biometrics methods and applications, Nov. 2003.

(Continued)

*Primary Examiner* — David García Cervetti
(74) *Attorney, Agent, or Firm* — Kevin McDermott, Esq.

(57) ABSTRACT

A method of authentication is provided that includes capturing biometric data for a desired biometric type from an individual, determining an algorithm for converting the biometric data into authentication words, converting the captured biometric data into authentication words in accordance with the determined algorithm, including the authentication words in a probe, and comparing the probe against identity records stored in a server system. Each of the identity records includes enrollment biometric words of an individual obtained during enrollment. Moreover, the method includes identifying at least one of the identity records as a potential matching identity record when at least one of the authentication words included in the probe matches at least one of the enrollment biometric words included in the at least one identity record, and generating a list of potential matching identity records.

18 Claims, 11 Drawing Sheets

(51) Int. Cl.
*G06K 9/00* (2006.01)
*G06K 9/72* (2006.01)

(56) References Cited

U.S. PATENT DOCUMENTS

| | | | |
|---|---|---|---|
| 4,135,147 A * | 1/1979 | Riganati et al. | 382/125 |
| 4,185,270 A * | 1/1980 | Fischer, II et al. | 382/125 |
| 4,646,352 A * | 2/1987 | Asai et al. | 382/125 |
| 4,747,147 A | 5/1988 | Sparrow | |
| 4,752,966 A | 6/1988 | Schiller | |
| 4,817,183 A | 3/1989 | Sparrow | |
| 5,109,428 A | 4/1992 | Igaki et al. | |
| 5,224,173 A * | 6/1993 | Kuhns et al. | 382/116 |
| 5,420,937 A | 5/1995 | Davis | |
| 5,493,621 A | 2/1996 | Matsumura | |
| 5,548,667 A * | 8/1996 | Tu | 382/285 |
| 5,613,014 A | 3/1997 | Eshera et al. | |
| 5,828,779 A * | 10/1998 | Maggioni | 382/165 |
| 5,933,516 A | 8/1999 | Tu et al. | |
| 5,982,914 A | 11/1999 | Lee et al. | |
| 6,041,133 A | 3/2000 | Califano et al. | |
| 6,049,621 A | 4/2000 | Jain et al. | |
| 6,072,895 A | 6/2000 | Bolle et al. | |
| 6,134,340 A | 10/2000 | Hsu et al. | |
| 6,185,316 B1 | 2/2001 | Buffam | |
| 6,185,317 B1 | 2/2001 | Nakayama | |
| 6,185,318 B1 | 2/2001 | Jain et al. | |
| 6,219,794 B1 | 4/2001 | Soutar et al. | |
| 6,233,348 B1 * | 5/2001 | Fujii et al. | 382/125 |
| 6,256,737 B1 * | 7/2001 | Bianco et al. | 713/186 |
| 6,266,433 B1 | 7/2001 | Bolle et al. | |
| 6,282,304 B1 | 8/2001 | Novikov et al. | |
| 6,314,197 B1 | 11/2001 | Jain et al. | |
| 6,330,347 B1 | 12/2001 | Vajna | |
| 6,363,485 B1 * | 3/2002 | Adams et al. | 713/186 |
| 6,487,306 B1 | 11/2002 | Jain et al. | |
| 6,546,122 B1 | 4/2003 | Russo | |
| 6,571,014 B1 | 5/2003 | Larkin | |
| 6,580,814 B1 * | 6/2003 | Ittycheriah et al. | 382/115 |
| 6,681,034 B1 | 1/2004 | Russo | |
| 6,735,695 B1 | 5/2004 | Gopalakrishnan et al. | |
| 6,766,040 B1 | 7/2004 | Catalano et al. | |
| 6,778,687 B2 | 8/2004 | Sanders et al. | |
| 6,778,688 B2 | 8/2004 | Aggarwal et al. | |
| 6,836,554 B1 * | 12/2004 | Bolle et al. | 382/116 |
| 6,895,104 B2 | 5/2005 | Wendt et al. | |
| 6,928,546 B1 * | 8/2005 | Nanavati et al. | 713/186 |
| 6,941,003 B2 | 9/2005 | Ziesig | |
| 6,941,461 B2 | 9/2005 | Carro et al. | |
| 6,957,337 B1 * | 10/2005 | Chainer et al. | 713/186 |
| 6,963,659 B2 | 11/2005 | Tumey et al. | |
| 7,020,308 B1 * | 3/2006 | Shinzaki et al. | 382/124 |
| 7,046,829 B2 | 5/2006 | Udupa et al. | |
| 7,047,137 B1 * | 5/2006 | Kasif et al. | 702/20 |
| 7,099,498 B2 | 8/2006 | Lo | |
| 7,114,646 B2 | 10/2006 | Hillhouse | |
| 7,136,514 B1 | 11/2006 | Wong | |
| 7,151,846 B1 * | 12/2006 | Fujii | 382/125 |
| 7,172,113 B2 * | 2/2007 | Olenick et al. | 235/380 |
| 7,194,393 B2 | 3/2007 | Wei et al. | |
| 7,206,437 B2 | 4/2007 | Kramer et al. | |
| 7,233,685 B2 | 6/2007 | Miyasaka et al. | |
| 7,236,617 B1 | 6/2007 | Yau et al. | |
| 7,274,804 B2 | 9/2007 | Hamid | |
| 7,274,807 B2 | 9/2007 | Hillhouse et al. | |
| 7,298,873 B2 * | 11/2007 | Miller et al. | 382/116 |
| 7,308,708 B2 | 12/2007 | Blume | |
| 7,315,634 B2 | 1/2008 | Martin | |
| 7,327,859 B1 | 2/2008 | Chau | |
| 7,330,566 B2 * | 2/2008 | Cutler | 382/103 |
| 7,333,641 B2 * | 2/2008 | Hara et al. | 382/125 |
| 7,349,559 B2 | 3/2008 | Miyasaka | |
| 7,349,560 B2 * | 3/2008 | Miyazaki | 382/124 |
| 7,356,168 B2 * | 4/2008 | Tavares | 382/115 |
| 7,359,532 B2 | 4/2008 | Acharya et al. | |
| 7,359,533 B2 * | 4/2008 | Moon et al. | 382/124 |
| 7,362,884 B2 | 4/2008 | Willis et al. | |
| 7,391,891 B2 | 6/2008 | Hillhouse | |
| 7,400,749 B2 | 7/2008 | Hillhouse | |
| 7,440,929 B2 * | 10/2008 | Schneider et al. | 706/15 |
| 7,447,339 B2 | 11/2008 | Mimura et al. | |
| 7,461,266 B2 | 12/2008 | Chou | |
| 7,474,769 B1 | 1/2009 | McAfee, II et al. | |
| 7,474,773 B2 | 1/2009 | Chau | |
| 7,487,089 B2 | 2/2009 | Mozer | |
| 7,492,925 B2 | 2/2009 | Silvester | |
| 7,505,613 B2 | 3/2009 | Russo | |
| 7,512,807 B2 | 3/2009 | Hillhouse | |
| 7,542,590 B1 * | 6/2009 | Robinson et al. | 382/115 |
| 7,564,997 B2 * | 7/2009 | Hamid | 382/124 |
| 7,565,548 B2 | 7/2009 | Fiske et al. | |
| 7,596,245 B2 * | 9/2009 | Kaleedhass | 382/115 |
| 7,596,246 B2 * | 9/2009 | Miller et al. | 382/115 |
| 7,606,396 B2 * | 10/2009 | Miller et al. | 382/116 |
| 7,616,787 B2 * | 11/2009 | Boshra | 382/124 |
| 7,747,044 B2 * | 6/2010 | Baker et al. | 382/116 |
| 7,773,784 B2 * | 8/2010 | Boult | 382/124 |
| 7,822,238 B2 * | 10/2010 | Bolle et al. | 382/124 |
| 7,835,548 B1 * | 11/2010 | Langley | 382/116 |
| 7,840,034 B2 * | 11/2010 | Takahashi et al. | 382/116 |
| 7,899,217 B2 * | 3/2011 | Uludag et al. | 382/115 |
| 7,929,732 B2 * | 4/2011 | Bringer et al. | 382/115 |
| 7,929,733 B1 * | 4/2011 | Lehnert et al. | 382/116 |
| 7,949,156 B2 * | 5/2011 | Willis | 382/115 |
| 7,956,890 B2 * | 6/2011 | Cheng et al. | 348/143 |
| 8,005,277 B2 * | 8/2011 | Tulyakov et al. | 382/125 |
| 8,468,355 B2 * | 6/2013 | Gerdes et al. | 713/175 |
| 8,472,680 B2 * | 6/2013 | Choi et al. | 382/116 |
| 8,482,859 B2 * | 7/2013 | Border et al. | 359/630 |
| 8,488,246 B2 * | 7/2013 | Border et al. | 359/630 |
| 2002/0018585 A1 | 2/2002 | Kim | |
| 2002/0028004 A1 * | 3/2002 | Miura et al. | 382/124 |
| 2002/0031245 A1 | 3/2002 | Rozenberg et al. | |
| 2003/0031340 A1 | 2/2003 | Alattar et al. | |
| 2003/0044052 A1 | 3/2003 | Martin | |
| 2003/0061233 A1 * | 3/2003 | Manasse et al. | 707/104.1 |
| 2003/0223624 A1 | 12/2003 | Hamid | |
| 2004/0042645 A1 | 3/2004 | Wang | |
| 2004/0099731 A1 * | 5/2004 | Olenick et al. | 235/380 |
| 2004/0101173 A1 * | 5/2004 | Hara et al. | 382/124 |
| 2004/0111625 A1 | 6/2004 | Duffy et al. | |
| 2004/0114786 A1 | 6/2004 | Cannon et al. | |
| 2004/0123113 A1 | 6/2004 | Mathiassen et al. | |
| 2004/0170306 A1 * | 9/2004 | Miyazaki | 382/124 |
| 2004/0193893 A1 | 9/2004 | Braithwaite et al. | |
| 2004/0230810 A1 | 11/2004 | Hillhouse | |
| 2004/0243356 A1 | 12/2004 | Duffy et al. | |
| 2005/0009498 A1 * | 1/2005 | Ho et al. | 455/402 |
| 2005/0039053 A1 * | 2/2005 | Walia | 713/201 |
| 2005/0084139 A1 * | 4/2005 | Kyle | 382/115 |
| 2005/0084143 A1 | 4/2005 | Kramer et al. | |
| 2005/0105783 A1 * | 5/2005 | Moon et al. | 382/124 |
| 2005/0168340 A1 * | 8/2005 | Mosher et al. | 340/572.8 |
| 2005/0207624 A1 | 9/2005 | Ehlers et al. | |
| 2005/0238207 A1 * | 10/2005 | Tavares | 382/115 |
| 2005/0249389 A1 | 11/2005 | Knowles | |
| 2006/0013446 A1 * | 1/2006 | Stephens | 382/115 |
| 2006/0047970 A1 | 3/2006 | Mochizuki | |
| 2006/0078171 A1 | 4/2006 | Govindaraju et al. | |
| 2006/0093190 A1 * | 5/2006 | Cheng et al. | 382/115 |
| 2006/0098850 A1 | 5/2006 | Hamid | |
| 2006/0101281 A1 | 5/2006 | Zhang et al. | |
| 2006/0104484 A1 | 5/2006 | Bolle et al. | |
| 2006/0104485 A1 * | 5/2006 | Miller et al. | 382/115 |
| 2006/0104493 A1 | 5/2006 | Hsieh et al. | |
| 2006/0120578 A1 | 6/2006 | Shatford | |
| 2006/0171571 A1 * | 8/2006 | Chan et al. | 382/115 |
| 2006/0210170 A1 * | 9/2006 | Yumoto et al. | 382/219 |
| 2006/0260988 A1 * | 11/2006 | Schneider et al. | 209/583 |
| 2007/0003114 A1 | 1/2007 | Hendriks et al. | |
| 2007/0009140 A1 | 1/2007 | Jitsui et al. | |
| 2007/0017136 A1 * | 1/2007 | Mosher et al. | 40/633 |
| 2007/0031009 A1 * | 2/2007 | Mwale | 382/115 |
| 2007/0031014 A1 * | 2/2007 | Soderberg et al. | 382/125 |

(56) References Cited

U.S. PATENT DOCUMENTS

| | | | |
|---|---|---|---|
| 2007/0036400 A1 | 2/2007 | Watanabe et al. | |
| 2007/0041622 A1 | 2/2007 | Salva Calcagno | |
| 2007/0047770 A1* | 3/2007 | Swope et al. | 382/115 |
| 2007/0050636 A1* | 3/2007 | Menczel et al. | 713/186 |
| 2007/0096870 A1 | 5/2007 | Fisher | |
| 2007/0162963 A1 | 7/2007 | Penet et al. | |
| 2007/0172114 A1* | 7/2007 | Baker et al. | 382/160 |
| 2007/0174633 A1* | 7/2007 | Draper et al. | 713/186 |
| 2007/0183632 A1* | 8/2007 | Bringer et al. | 382/115 |
| 2007/0186106 A1* | 8/2007 | Ting et al. | 713/168 |
| 2007/0217708 A1* | 9/2007 | Bolle et al. | 382/276 |
| 2007/0226496 A1 | 9/2007 | Maletsky et al. | |
| 2007/0241861 A1* | 10/2007 | Venkatanna et al. | 340/5.52 |
| 2007/0253608 A1 | 11/2007 | Tulyakov et al. | |
| 2007/0253624 A1* | 11/2007 | Becker | 382/225 |
| 2007/0276853 A1* | 11/2007 | Hamza | 707/101 |
| 2007/0283165 A1* | 12/2007 | Milgramm et al. | 713/186 |
| 2007/0286465 A1* | 12/2007 | Takahashi et al. | 382/125 |
| 2008/0005578 A1* | 1/2008 | Shafir | 713/186 |
| 2008/0010674 A1 | 1/2008 | Lee | |
| 2008/0013794 A1 | 1/2008 | Kalker et al. | |
| 2008/0013808 A1 | 1/2008 | Russo et al. | |
| 2008/0049983 A1* | 2/2008 | Miller et al. | 382/115 |
| 2008/0052527 A1 | 2/2008 | Siedlarz | |
| 2008/0059807 A1* | 3/2008 | Miller et al. | 713/186 |
| 2008/0095410 A1* | 4/2008 | Shalev et al. | 382/115 |
| 2008/0118099 A1 | 5/2008 | Alattar et al. | |
| 2008/0172386 A1* | 7/2008 | Ammar et al. | 707/6 |
| 2008/0172729 A1* | 7/2008 | Takamizawa et al. | 726/7 |
| 2008/0192988 A1* | 8/2008 | Uludag et al. | 382/115 |
| 2008/0199077 A1 | 8/2008 | Fowell | |
| 2008/0211627 A1* | 9/2008 | Shinzaki | 340/5.82 |
| 2008/0221735 A1* | 9/2008 | Schaffer et al. | 700/275 |
| 2008/0235515 A1* | 9/2008 | Yedidia et al. | 713/186 |
| 2008/0253619 A1* | 10/2008 | Hagino et al. | 382/115 |
| 2008/0285815 A1* | 11/2008 | Bolle et al. | 382/115 |
| 2008/0298649 A1 | 12/2008 | Ennis et al. | |
| 2009/0022374 A1 | 1/2009 | Boult | |
| 2009/0023428 A1 | 1/2009 | Behzad et al. | |
| 2009/0027351 A1 | 1/2009 | Zhang et al. | |
| 2009/0113209 A1 | 4/2009 | Lee et al. | |
| 2009/0116703 A1* | 5/2009 | Schultz | 382/118 |
| 2009/0138724 A1 | 5/2009 | Chiou et al. | |
| 2009/0138725 A1 | 5/2009 | Madhvanath et al. | |
| 2009/0169064 A1 | 7/2009 | Kim et al. | |
| 2009/0183008 A1 | 7/2009 | Jobmann | |
| 2009/0199282 A1* | 8/2009 | Tsitkova et al. | 726/7 |
| 2009/0231096 A1* | 9/2009 | Bringer et al. | 340/5.82 |
| 2009/0287930 A1* | 11/2009 | Nagaraja | 713/171 |
| 2009/0294523 A1* | 12/2009 | Marano et al. | 235/380 |
| 2009/0310779 A1* | 12/2009 | Lam et al. | 380/46 |
| 2009/0310830 A1 | 12/2009 | Bolle et al. | |
| 2010/0014718 A1 | 1/2010 | Savvides et al. | |
| 2010/0039223 A1 | 2/2010 | Siedlarz | |
| 2010/0046806 A1* | 2/2010 | Baughman et al. | 382/115 |
| 2010/0060411 A1* | 3/2010 | Ikegami | 340/5.53 |
| 2010/0066493 A1* | 3/2010 | Rachlin | 340/5.82 |
| 2010/0111376 A1* | 5/2010 | Yan et al. | 382/118 |
| 2010/0162072 A1* | 6/2010 | Chabanne et al. | 714/752 |
| 2010/0174914 A1* | 7/2010 | Shafir | 713/186 |
| 2010/0185864 A1* | 7/2010 | Gerdes et al. | 713/175 |
| 2010/0214062 A1* | 8/2010 | Hayashida | 340/5.82 |
| 2010/0228692 A1* | 9/2010 | Guralnik et al. | 706/12 |
| 2010/0232659 A1* | 9/2010 | Rahmes et al. | 382/115 |
| 2010/0257369 A1* | 10/2010 | Baker | 713/186 |
| 2010/0277274 A1* | 11/2010 | Toleti et al. | 340/5.7 |
| 2010/0284575 A1* | 11/2010 | Yoshimine et al. | 382/116 |
| 2010/0312763 A1* | 12/2010 | Peirce | 707/723 |
| 2011/0010558 A1* | 1/2011 | Baldan et al. | 713/186 |
| 2011/0032076 A1* | 2/2011 | Rickman | 340/5.82 |
| 2011/0037563 A1* | 2/2011 | Choi et al. | 340/5.83 |
| 2011/0188709 A1* | 8/2011 | Gupta et al. | 382/115 |
| 2011/0211735 A1* | 9/2011 | Langley | 382/115 |
| 2012/0011565 A1* | 1/2012 | Garlie et al. | 726/2 |
| 2012/0057764 A1* | 3/2012 | Hara et al. | 382/125 |
| 2012/0140996 A1* | 6/2012 | Hara et al. | 382/124 |
| 2012/0230555 A1* | 9/2012 | Miura et al. | 382/124 |
| 2012/0262275 A1* | 10/2012 | Schultz | 340/5.83 |

FOREIGN PATENT DOCUMENTS

| | | |
|---|---|---|
| GB | 2 050 026 A | 12/1980 |
| GB | 2 452 116 A | 2/2009 |
| JP | 2003-178307 | 6/2003 |
| WO | WO 87/01224 | 2/1987 |
| WO | WO 2009/004215 | 1/2009 |
| WO | WO 2009/081866 A1 | 7/2009 |

OTHER PUBLICATIONS

"Generating Cancelable Fingerprint Templates," Ratha et al., Pattern Analysis and Machine Intelligence, IEEE Transactions on, Apr. 2007, vol. 29 , Issue: 4 pp. 561-572.

"Efficient Finger Print Image Classification and Recognition using Neural Network Data Mining," Umamaheswaari et al., International Conference, Feb. 2007, pp. 426-432.

"A cost-effective fingerprint recognition system for use with low-quality prints and damaged fingertips," Willis et al., Pattern Recognition 34 (2001) pp. 255-270.

Combining Cryptography with Biometrics for Enhanced Security, Venkatachalam, et al., Conference on Control, Automation, Comm. and Energy Conversation, 2009. pp. 1-6.

Randomized Radon Transforms for Biometric Authentication via Fingerprint Hashing, Jakubowski et al., Microsoft Research, Redmond,WA, 7th ACM DRM Workshop Oct. 29, 2007, pp. 90-94.

The Development of Destination-Specific Biometric Authentication Andrew R. Mark, Apr. 15, 2000, Network Security Library :: Auth. & Access Control, pp. 77-80.

Integrating Faces and Fingerprints for Personal Identification, Hong et al., IEEE Transactions on Pattern Analysis and Machine Intelligence,vol. 20,No. 12, pp. 1295-1307 Dec. 1998.

Shihua He et al., Clustering-Based Descriptors for Fingerprint Indexing and Fast Retrieval, Computer Vision—ACCV 2009: 9th Asian Conf on Comp. Vision, Sep. 23, 2009, pp. 354-363.

Unsang Park et al., Periocular Biometrics in the Visible Spectrum: A Feasibility Study, Biometrics: Theory, Applications, and Systems 2009, Sep. 28, 2009, pp. 1-6.

Xu Zhao et al., Discrimitive Estimation of 3D Human Pose Using Gaussian Processes, 19th Int. Conf. on Pattern Recognition, 2008, Dec. 8, 2008, p. 1-4.

Di Liu et al., Bag-of-Words Vector Quantization Based Face Identification, Electronic Commerce and Security, May 22, 2009, pp. 29-33.

Josef Sivic et al., Person Spotting: Video Shot Retrieval for Face Sets, Image and Video Retrieval, Aug. 4, 2005, pp. 226-236.

Fergus R. et al., Object Class Recognition by Unsupervised Scale-Invarient Learning, IEEE Comp. Society Conf. on Comp. Vision and Pattern Recognition, Jun. 18, 2003, pp. 264-271.

Sivic et al., Video Google: A Text Retrieval Approach to Object Matching in Videos, 9th IEEE Int. Conf. on Computer Vision, Oct. 13, 2003, pp. 1470-1477, vol. 2.

Omar Hamdoun et al., Person Re-Identification in Multi-Camera System by Signature Based on Interest Point Descriptors Collected on Short Video Sequences, Sep. 7, 2008, pp. 1-6.

Extended European Seach Report for counterpart foreign application EPO No. 11152343.7 mailed Apr. 28, 2011.

Extended European Seach Report for EPO application No. 11152341.1 mailed Apr. 28, 2011.

"Discrete finger and palmar feature extraction for personal authentication," Doi, J.; Yamanaka, M.; Kajita, H.; Intel Signal Processing, 2003 IEEE Int'l Symp., pp. 37-42.

"Biometric authentication using finger and palmar creases," Junta Doi; Yamanaka, M.; Virtual Environments, Human-Computer Interfaces and Meas Sys., 2004,pp. 72-76.

"Discrete finger and palmar feature extraction for personal authentication," Doi, J.; Yamanaka, M.; Instr. and Meas.,IEEE Trans.,vol. 54, No. 6, Dec. 2005,pp. 2213-2219.

\* cited by examiner

44

| IDENTITY RECORD |
|---|

BIOGRAPHIC DATA — 46

Individual's Name:   Florence D. Soltis

Date of Birth:   October 3, 1927

Address:   42 East Chestnut St., Wilkes Barre, PA

Marital Status:   Single

Citizenship:   United States

| BIOMETRIC — 48 TYPE | BIOMETRIC WORDS — 50 |
|---|---|
| Finger – Left Index | R22R23C8C9  R22R23C9C10 |
| | R20R21C8C9 |
| | R21R22C6C7  R22R23C6C7 |
| | R24R25C2C3 |
| | R26R27C2C3, R27R28C1C2 |
| | R30R3100C1, R3R4C6C7 |
| | R14R1500C1, R16R17C9C10 |
| Finger – Right Index | |
| Iris - Left | |
| Iris - Right | |

| IDENTITY RECORD |
|---|

BIOGRAPHIC DATA — 46

Individual's Name:  Florence D. Soltis

Date of Birth:  October 3, 1927

Address:  42 East Chestnut St., Wilkes Barre, PA

Marital Status:  Single

Citizenship:  United States

BIOMETRIC TYPE — 48                    BIOMETRIC TEXT— 50
                                                                STRING
Finger – Left Index                              S22B9 S22B10
                                                                S20B9
                                                                S22B7 S21B7
                                                                S24B3
                                                                S26B3, S27B2
                                                                S30B1, S3B7
                                                                S14B1, S16B10

Finger – Right Index

Iris - Left

Iris - Right

FIG. 8

METHOD AND SYSTEM FOR BIOMETRIC AUTHENTICATION

CROSS-REFERENCE TO RELATED APPLICATIONS

This is a continuation application of U.S. patent application Ser. No. 12/857,337, filed Aug. 16, 2010, now U.S. Pat. No. 8,041,956, issued Oct. 18, 2011, the disclosure of which is incorporated herein by reference.

BACKGROUND OF THE INVENTION

This invention relates generally to authenticating individuals, and more particularly, to a method and system for biometric authentication.

Generally, biometric authentication systems are used to identify and verify the identity of individuals and are used in many different contexts such as verifying the identity of individuals entering a country using electronic passports. Biometric authentication systems have also been known to verify the identity of individuals using driver's licenses, traveler's tokens, employee identity cards and banking cards.

Known biometric authentication system search engines generally identify individuals using biometric feature templates derived from raw biometric data captured from individuals. Specifically, a biometric feature template derived from biometric data captured from an individual during authentication is compared against a database of previously derived biometric feature templates, and the identity of the individual is verified upon determining a match between one of the stored biometric feature templates and the biometric feature template derived during authentication. However, comparing biometric feature templates against a database of biometric feature templates may place substantial demands on computer system memory and processing which may result in unacceptably long authentication periods. Moreover, such known biometric authentication system search engines are generally highly specialized and proprietary.

By virtue of being highly specialized and proprietary it has been known to be difficult, time consuming and costly to modify known biometric authentication search engines to operate with other authentication systems. Furthermore, known biometric authentication search engines, by virtue of evaluating only biometric data of an individual for authentication, in many cases, do not provide an adequate amount of information about the individual to yield consistently accurate authentication results.

BRIEF DESCRIPTION OF THE INVENTION

In one aspect of the invention, a method of authentication is provided. The method includes capturing biometric data for a desired biometric type from an individual, determining an algorithm for converting the biometric data into authentication words, converting the captured biometric data into authentication words in accordance with the determined algorithm, including the authentication words in a probe, and comparing the probe against identity records stored in a server system. Each of the identity records includes enrollment biometric words of an individual obtained during enrollment. Moreover, the method includes identifying at least one of the identity records as a potential matching identity record when at least one of the authentication words included in the probe matches at least one of the enrollment biometric words included in the at least one identity record, and generating a list of potential matching identity records.

In another aspect of the invention, a system for biometric authentication is provided. The system includes a computer configured as a server. The server includes at least a data base and is configured to store within the database at least one conversion algorithm and at least a gallery of data including identity records. Each identity record includes at least biographic data of an individual and enrollment biometric words of the individual. The at least one client system includes at least a computer configured to communicate with the server. The client system is configured to at least capture biometric data for at least one desired biometric type from an individual.

The server is also configured to convert the captured biometric data into authentication words by executing the at least one conversion algorithm. The at least one conversion algorithm is configured to generate the enrollment biometric words. Moreover, the server is configured to generate a probe including at least the authentication words, compare the probe against the gallery, and identify at least one of the identity records as a matching identity record when at least one of the authentication words matches at least one of the enrollment biometric words included in the at least one identity record. Furthermore, the server is configured to generate a list of potential matching identity records.

In yet another aspect of the invention, a method of text-based biometric authentication is provided. The method includes capturing biometric data for a plurality of different biometric types from an individual and determining a plurality of algorithms. Each of the algorithms is operable to convert captured biometric data of a corresponding biometric type into a vocabulary of words. Moreover, the method includes converting the captured biometric data for each biometric type into authentication words in accordance with the corresponding one of the algorithms and comparing a probe against identity records stored in a server system. The probe includes authentication words and biographic words, and each of the identity records includes at least enrollment biometric words and biographic words of a corresponding individual obtained during enrollment. Furthermore, the method includes identifying at least one of the identity records as a potential matching identity record when at least one of the biographic words included in the probe or at least one of the authentication words included in the probe matches at least one of the biographic words or one of the enrollment biometric words, respectively, included in the at least one identity record. The method also includes generating a list of potential matching identity records.

BRIEF DESCRIPTION OF THE DRAWINGS

FIG. 7 is an exemplary identity record including biographic data, types of biometric data and words;

FIG. 8 is an alternative exemplary identity record including biographic data, types of biometric data and words;

DETAILED DESCRIPTION OF THE INVENTION

Figure 1:
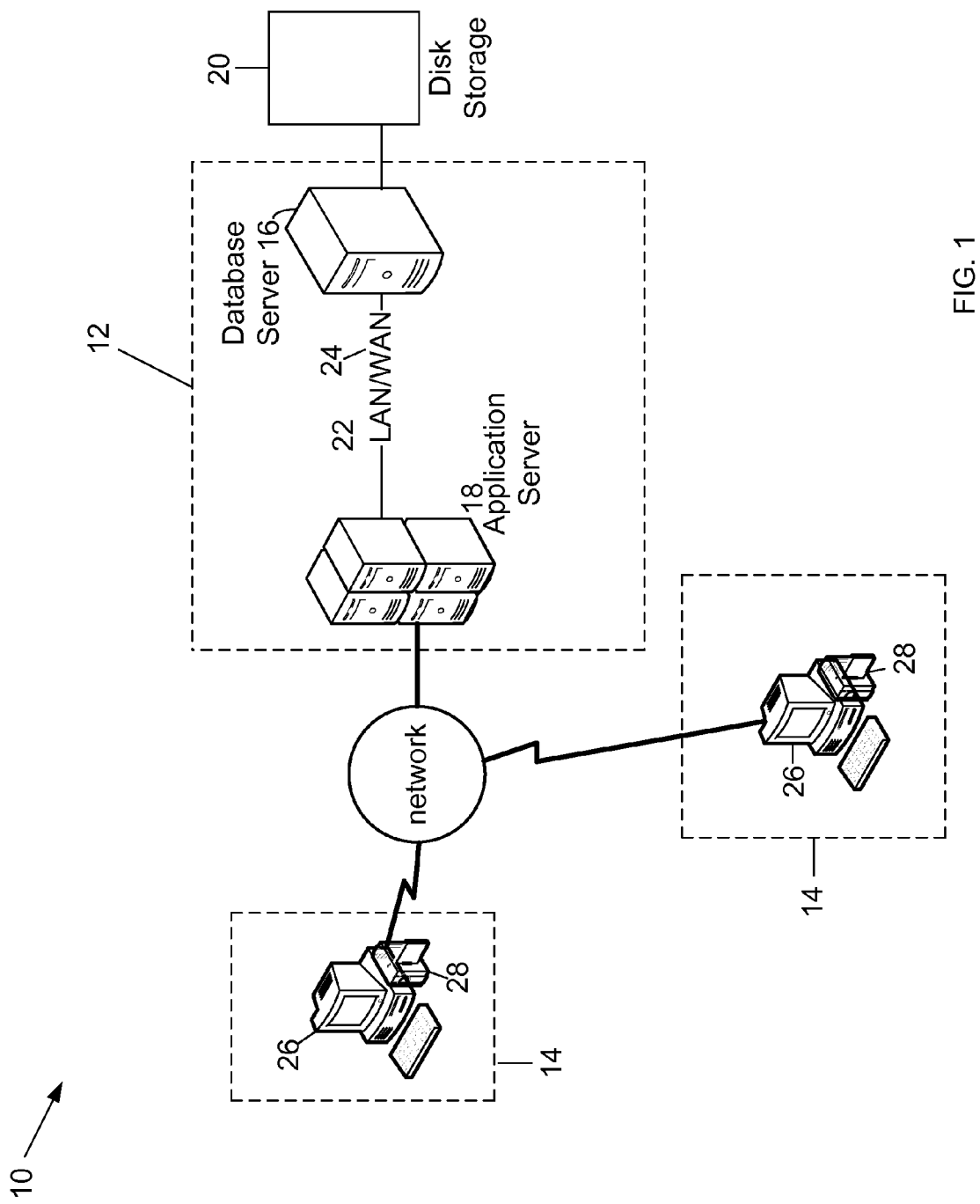
FIG. 1 is a block diagram of an exemplary embodiment of a server architecture of a computer system used for authenticating the identity of an individual.

FIG. 1 is an expanded block diagram of an exemplary embodiment of a server architecture of an authentication computer (AC) system 10 used for authenticating the identity of an individual. The AC system 10 includes a server system 12 and client computer systems 14. Client computer systems 14 are generally operated by any individual authorized to access the server system 12 such as, but not limited to, employees of entities that administer public or private programs. In the exemplary embodiment, the server system 12 includes components such as, but not limited to, a database server 16 and an application server 18. A disk storage unit 20 is coupled to the database server 16. It should be appreciated that the disk storage unit 20 may be any kind of data storage and may store any kind of data including, but not limited to, at least one conversion algorithm, captured raw biometric data, biometric template data, and identity records that include at least biographic data and enrollment biometric words. Servers 16 and 18 are coupled in a local area network (LAN) 22. However, it should be appreciated that in other embodiments the servers 16 and 18 may be coupled together in any manner including in a wide area network (WAN) 24. Moreover, it should be appreciated that in other embodiments additional servers may be included in the server system 12 that perform the same or different functions as servers 16 and 18.

The database server 16 is connected to a database that is stored on the disk storage unit 20, and can be accessed by authorized users from any of the client computer systems 14 in any manner that facilitates authenticating individuals as described herein. The database may be configured to store documents in any type of database including, but not limited to, a relational object database or a hierarchical database. Moreover the database may be configured to store data in formats such as, but not limited to, text documents and binary documents. In an alternative embodiment, the database is stored remotely from the server system 12. The server system 12 is configured to conduct any type of matching of any feature or information associated with individuals as described herein. The server system 12 is also configured to determine at least one conversion algorithm for converting biometric data into words.

The server system 12 is typically configured to be communicatively coupled to client computer systems 14 using the Local Area Network (LAN) 22. However, it should be appreciated that in other embodiments, the server system 12 may be communicatively coupled to end users at computer systems 14 via any kind of network including, but not limited to, a Wide Area Network (WAN), the Internet, and any combination of LAN, WAN and the Internet. Any authorized end user at the client computer systems 14 can access the server system 12, and authorized client computer systems 14 may automatically access the computer system 12 and vice versa.

In the exemplary embodiment, the client computer systems 14 may be computer systems associated with entities that administer programs requiring improved identity authentication. Such programs include, but are not limited to, driver licensing programs, Visa programs, national identity programs, offender programs, welfare programs and taxpayer registration programs. Moreover, each client system 14 may be used to manage and administer a plurality of such programs. Each of the client computer systems 14 includes at least one personal computer 26 configured to communicate with the server system 12. Moreover, the personal computers 26 include devices, such as, but not limited to, a CD-ROM drive for reading data from computer-readable recording mediums, such as a compact disc-read only memory (CD-ROM), a magneto-optical disc (MOD) and a digital versatile disc (DVD). Additionally, the personal computers 26 include a memory (not shown). Moreover, the personal computers 26 include display devices, such as, but not limited to, liquid crystal displays (LCD), cathode ray tubes (CRT) and color monitors. Furthermore, the personal computers 26 include printers and input devices such as, but not limited to, a mouse (not shown), keypad (not shown), a keyboard, a microphone (not shown), and biometric capture devices 28.

Although the client computer systems 14 include personal computers 26 in the exemplary embodiment, it should be appreciated that in other embodiments the client computer systems 14 may include portable communications devices capable of at least displaying messages and images, and capturing and transmitting authentication data. Such portable communications devices include, but are not limited to, a smart phone and any type of portable communications device having wireless capabilities such as a personal digital assistant (PDA) and a laptop computer. Moreover, it should be appreciated that in other embodiments the client computer systems 14 may include any computer system that facilitates authenticating the identity of an individual as described herein such as, but not limited to, server systems.

Each of the biometric capture devices 28 includes hardware configured to capture at least one specific type of biometric sample. In the exemplary embodiment, each biometric capture device 28 may be any device that captures any type of desired biometric sample. Such devices include, but are not limited to, microphones, iris scanners, fingerprint scanners, vascular scanners and digital cameras. Thus, each of the client systems 14 is configured to at least capture biometric data for a desired biometric type from an individual. It should be appreciated that although the exemplary embodiment includes two client computer systems 14 each including at least one personal computer 26, in other embodiments any number of client computer systems 14 may be provided and each of the client computer systems 14 may include any number of personal computers 26.

Application server 18 and each personal computer 26 includes a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that computer programs, or instructions, are stored on a computer-readable recording medium, such as the memory (not shown) of application server 18 and of the personal computers 26, and are executed by the processor. The above examples are exemplary only, and are thus not intended to limit in any way the definition and/or meaning of the term "processor."

The memory (not shown) included in application server 18 and in the personal computers 26, can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

It should be appreciated that the memory of the application server 18 and of the personal computers 26 is used to store executable instructions, applications or computer programs, thereon. The terms "computer program" and "application" are intended to encompass an executable program that exists permanently or temporarily on any computer-readable recordable medium that causes the computer or computer processor to execute the program. In the exemplary embodiment, a parser application and a generic filtering module (GFM) application are stored in the memory of the application server 18. The parser application causes the application server 18 to convert biometric data into at least text strings according to a determined conversion algorithm. At least one of the text-strings is included in a probe that may be generated by the GFM application. The probe may also be generated by another application, different than the GFM application, stored in the server system 12 or any of the client systems 14. Text strings are also known as words. The probe may include any data such as, but not limited to, words. Specifically, words generated from biometric data captured during enrollment are referred to herein as enrollment biometric words and words generated from biometric data captured during authentication are referred to herein as authentication words.

The GFM application is a text search engine which causes the application server 18 to compare the probe against identity records stored in the server system 12. Moreover, the GFM application causes the application server 18 to generate a list of potential matching identity records according to the similarity between the probe and the identity records in the server system 12. Furthermore, the GFM application causes the application server 18 to determine the similarity between the probe and identity records using one of a plurality of authentication policies and rules included in the GFM application itself. However, it should be appreciated that in other embodiments the authentication policies and rules may not be included in the GFM application. Instead, the authentication policies and rules may be stored in the server system 12 separate from the GFM application or in any of the client systems 14. It should be understood that the authentication policies may determine the similarity between a probe and the identity records on any basis, such as, but not limited to, according to the number of matching words between the probe and each of the identity records. Although the parser application is stored in the application server 18 in the exemplary embodiment, it should be appreciated that in other embodiments the parser application may be stored in any of the client systems 14.

Figure 2:
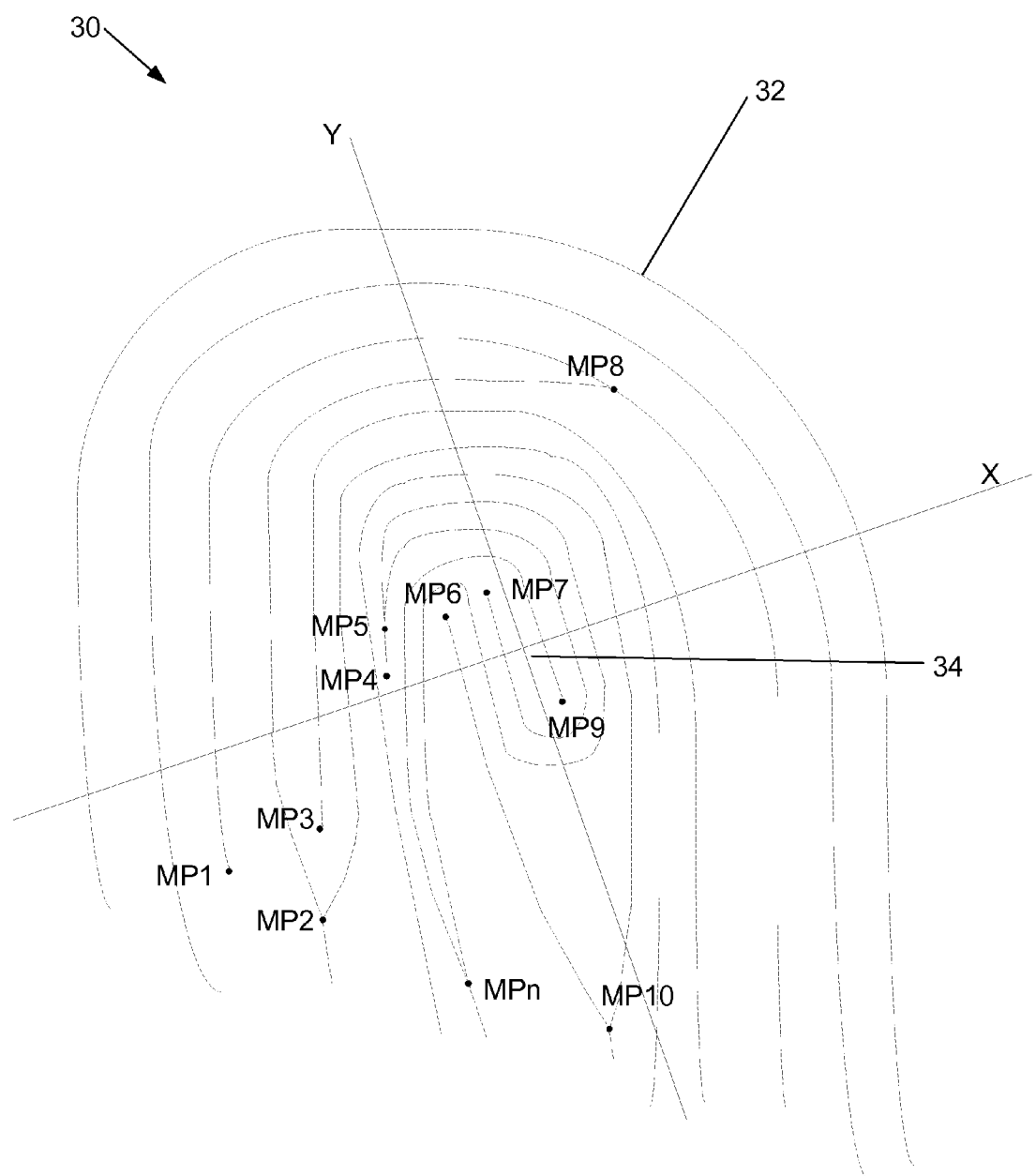
FIG. 2 is a plan view of an exemplary fingerprint image of processed biometric data.

FIG. 2 is a plan view of an exemplary fingerprint image 30 of processed biometric data. Specifically, the fingerprint image 30 constitutes biometric data captured from an individual using one of the biometric capture devices 28, and includes biometric features such as, but not limited to, ridge endings and ridge bifurcations. Because these biometric features constitute small discrete points in the fingerprint 30, they are referred to as minutia points MPn. Thus, the minutia points MPn represent biometric features of the captured biometric data. By virtue of determining the locations of minutia points MPn within the fingerprint image 30 and including the minutia points MPn as data in a biometric feature template, the biometric features are extracted from the captured fingerprint biometric data and are included as data in the biometric feature template. It should be understood that biometric feature templates are usually a smaller compact representation of the biometric features included in the captured biometric data, and are used for authenticating individuals. The captured biometric data is usually archived.

Although the captured biometric data is from a fingerprint in the exemplary embodiments described herein, it should be appreciated that in other embodiments the captured biometric data may be from any other biometric type or combinations of biometric types including, but not limited to, face, voice, and iris. Moreover, it should be appreciated that such other biometric types may have biometric features different than the biometric features of fingerprints that can be extracted from the captured biometric data and included in a biometric feature template. For example, when iris biometric data is captured during authentication, phase information and masking information of the iris may be extracted from the captured iris biometric data and included as data in a biometric feature template. Although the captured biometric data is processed into a biometric feature template in the exemplary embodiment, it should be appreciated that in other embodiments the captured biometric data may be processed into any form that facilitates authenticating the individual, such as, but not limited to, photographs and electronic data representations.

A longitudinal direction of ridges 32 in a core 34 of the fingerprint is used to determine the orientation of the fingerprint image 30. Specifically, a Cartesian coordinate system is electronically superimposed on the image 30 such that an axis Y is positioned to extend through the core 34 in the longitudinal direction, and another axis X is positioned to pass through the core 34 and to perpendicularly intersect the Y-axis at the core 34. It should be appreciated that the intersection of the X and Y axes constitutes an origin of the Cartesian coordinate system.

Figure 3:
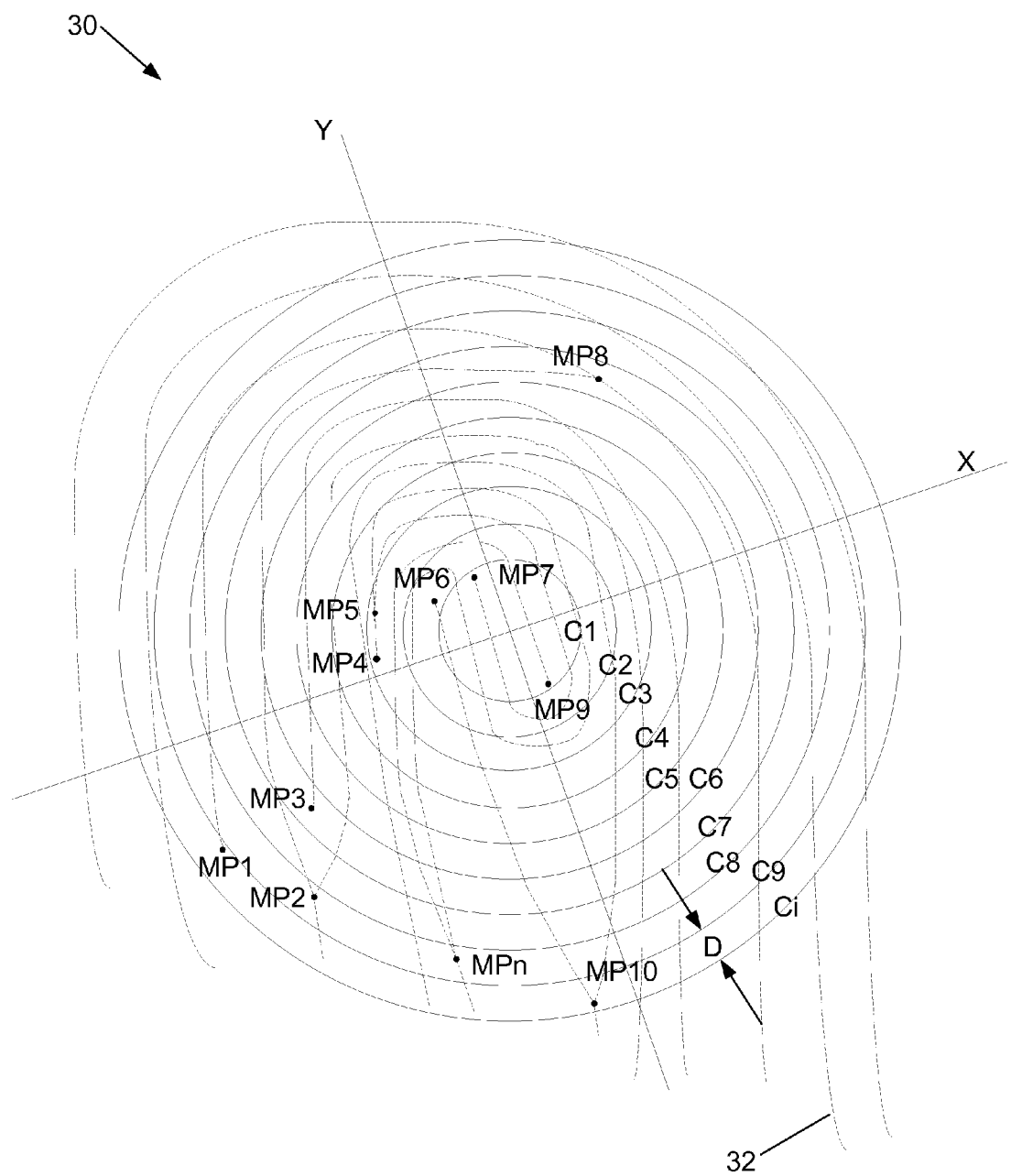
FIG. 3 is the plan view of the exemplary fingerprint image as shown in FIG. 2 including concentric circles positioned thereon.

FIG. 3 is the plan view of the exemplary fingerprint image 30 as shown in FIG. 2, further including a plurality of circles $C_i$ electronically superimposed on the fingerprint image 30 such that the circles $C_i$ are concentrically positioned about the origin of the Cartesian coordinate system. In the exemplary embodiment, the circles $C_i$ are positioned such that they are radially uniformly separated from each other by a distance D. It should be appreciated that the distance D may be any distance that facilitates authenticating the identity of an individual as described herein.

Figure 4:
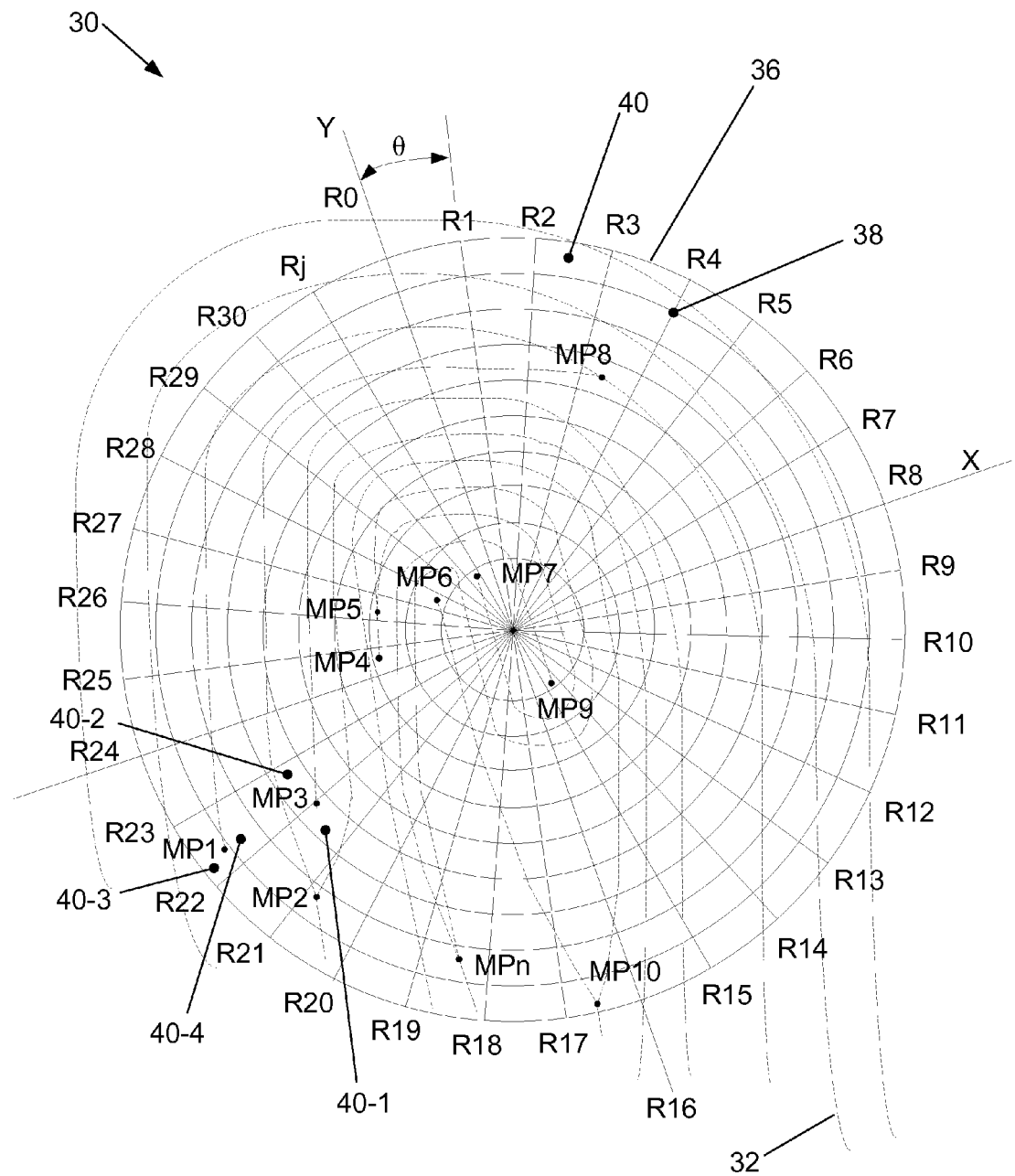
FIG. 4 is the plan view of the exemplary fingerprint image as shown in FIG. 2 further including a radial grid positioned thereon for determining exemplary words from biometric data.

FIG. 4 is the plan view of the exemplary fingerprint image 30 as shown in FIG. 2 further including a radial grid 36 positioned thereon for determining exemplary words from biometric data. Specifically, a plurality of radial lines $R_j$ are electronically superimposed and positioned on the fingerprint image 30 such that the circles $C_i$ and the lines $R_j$ together define the radial grid 36 electronically superimposed on the fingerprint image 30. Each of the radial lines $R_j$ is separated by a same angle $\theta$. It should be appreciated that the designations "n," "i," and "j," as used in conjunction with the minutia points MPn, circles $C_i$ and radial lines $R_j$, respectively, are intended to indicate that any number "n" of minutia points, any number "i" of circles and any number "j" of radial lines may be used that facilitates authenticating the identity of an individual as described herein. Although the biometric feature template data of the exemplary embodiment includes minutia points MPn as biometric feature data, it should be appreciated that in other embodiments the biometric feature template data may include biometric feature data appropriate for any other biometric type including, but not limited to, face, voice and iris.

The radial lines Rj and circles Ci define a plurality of intersections 38 and a plurality of cells 40 in the radial grid 36. Coordinates based on the Cartesian coordinate system are computed for each intersection 38 and for each minutia point MPn to determine the position of each minutia point MPn relative to the radial grid 36. Specifically, the coordinates of each minutia point MPn are compared against the coordinates of the intersections 38, to determine one of the cells 40 that corresponds to and contains, each minutia point MPn. For example, by comparing the coordinates of the minutia point MP8 against the coordinates 38, it is determined that one of the cells 40 defined by radial lines R3 and R4, and circles C6 and C7, contains the minutia point MP8. Because the minutia point MP8 is contained in a cell 40 defined by radial lines R3, R4 and circles C6, C7, the position of minutia point MP8 may be expressed in a text string using radial line and circle designations derived from the radial grid 36. Specifically, in the exemplary embodiment, the position of the minutia point MP8 is expressed in the alphanumeric text string R3R4C6C7. Consequently, it should be understood that the position of each one of the minutia points MPn may be described textually in an alphanumeric text string derived from its corresponding cell 40. As such, it should be understood that superimposing the radial grid 36 on the fingerprint image 30 facilitates converting the minutia points MPn into text strings. It should be appreciated that any number of minutia points MPn may be positioned in any one of the cells 40 and that desirably, each of the minutia points MPn is positioned in a single one of the cells 40.

Each alphanumeric text string is an alphanumeric word that facilitates textually describing biometric features included in captured biometric data that is to be used for authentication. Moreover, because each word is derived from the position of a corresponding cell 40, each cell 40 of the radial grid 36 constitutes a word that may be used to facilitate textually describing biometric features included in captured biometric data. Furthermore, because the radial grid 36 includes a plurality of cells 40, the radial grid 36 defines a plurality of words that may be used to facilitate textually describing biometric features included in captured biometric data. Additionally, because a plurality of words constitutes a vocabulary, the radial grid 36 itself constitutes a vehicle for defining a vocabulary of words that may be used to facilitate textually describing biometric features included in captured biometric data. By using the radial grid 36 as described in the exemplary embodiment, an algorithm is executed that converts captured biometric data into words, included in a vocabulary of words, that may be used as the basis for authenticating the identity of an individual. Thus, it should be understood that by virtue of executing the conversion algorithm, words are generated that map to the vocabulary.

A biometric data sample captured for an identical biometric type from the same person may vary each time the biometric data sample is captured. Consequently, the positions of the biometric features included in the captured biometric data samples, and minutia points corresponding to the biometric features, may also vary. It should be appreciated that the minutia point variances generally do not affect the positions, and related words, of minutia points MPn within the grid 36. However, the minutia point variances may affect the positions, and related words, of minutia points MPn positioned proximate to or on a border between adjacent cells 40. It should be appreciated that by virtue of defining the plurality of cells 40, the radial lines Rj and circles Ci also define the borders between adjacent cells 40. Thus, minutia points positioned proximate to or on a radial line Rj or a circle Ci, may be located in different cells 40 in different biometric data samples captured for the identical biometric type from the same person. Minutia points MPn positioned proximate to or on a line Rj or a circle Ci are referred to herein as borderline minutia points.

Minutia point MP3 is positioned in a first cell 40-1 proximate the border R22 between the first cell 40-1 and a second cell 40-2 included in the radial grid 36. Thus, minutia point MP3 is a borderline minutia point whose position within the grid 36 may vary between different biometric data samples captured for the identical biometric type from the same person. Specifically, the location of minutia point MP3 within the grid 36 may vary such that in one biometric data sample the minutia point MP3 is located in cell 40-1 proximate the radial line R22, and in another biometric data sample of the identical biometric type the minutia point MP3 is located in cell 40-2 proximate radial line R22. Minutia point MP1 is also a borderline minutia point and is located within a third cell 40-3 proximate the circle C9 between the third cell 40-3 and a fourth cell 40-4. Thus, the position of minutia point MP1 within the grid 36 may also vary between captured biometric data samples. That is, the position of minutia point MP1 within the grid 36 may vary, similar to minutia point MP3, between cells 40-3 and 40-4 in different biometric data samples of an identical biometric type from the same person. Thus, it may be difficult to accurately determine a single cell 40 location for borderline minutia points such as MP1 and MP3.

Figure 5:
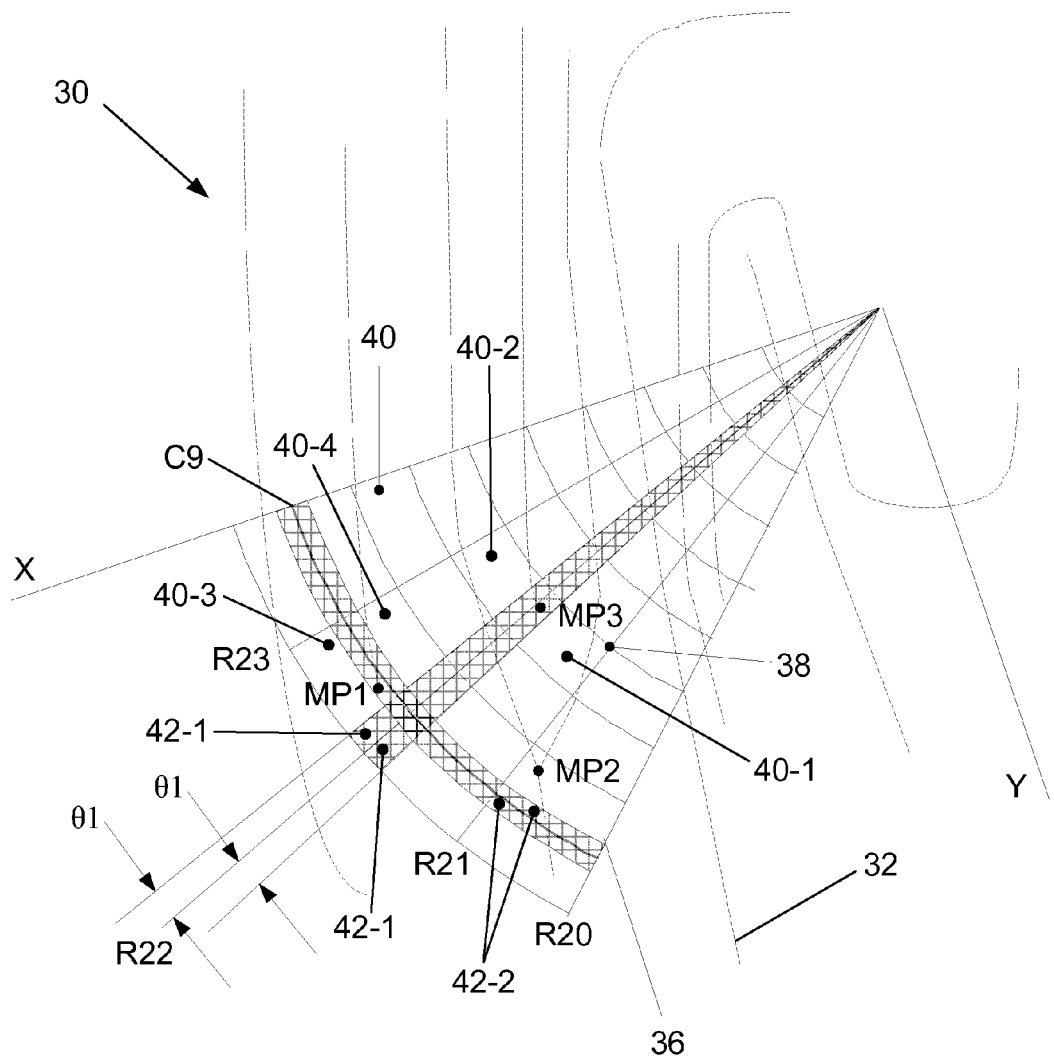
FIG. 5 is an enlarged partial plan view of FIG. 4, further including overlapping border regions.

The information shown in FIG. 5 is the same information shown in FIG. 4, but shown in a different format, as described in more detail below. As such, geometric and mathematical relationships illustrated in FIG. 5 that are identical to geometric and mathematical relationships illustrated in FIG. 4, are identified using the same reference numerals used in FIG. 4.

FIG. 5 is an enlarged partial plan view of the exemplary fingerprint image 30 and radial grid 36 as shown in FIG. 4, further including an overlapping border region 42-1 positioned about radial line R22 and another overlapping border region 42-2 positioned about circle C9. The overlapping border region 42-1 is electronically superimposed on the grid 36 and is formed by rotating the radial line R22 clockwise and counterclockwise about the origin of the Cartesian coordinate system by an angle $\theta 1$. In the exemplary embodiment, the angle $\theta 1$ is one degree. The overlapping border region 42-2 is electronically superimposed on the grid 36 and is formed by radially offsetting the circle C9 towards and away from the center of the Cartesian coordinate system by a predetermined distance. In the exemplary embodiment, the predetermined distance may be any distance that adequately captures borderline minutia points as described herein.

The overlapping border regions 42-1 and 42-2 operate to effectively expand the borders of adjacent cells so that the borders of adjacent cells 40 overlap. Thus, the overlapping border regions 42-1 and 42-2 effectively establish an area, representing a tolerance of positions of minutia points MPn, about the borders R22 and C9, respectively, within which the position of minutia points MP1 and MP3 may vary. Thus, it should be appreciated that minutia points located within the overlapping border regions 42-1 and 42-2 are borderline minutia points. Moreover, it should be appreciated that the overlapping border regions 42-1 and 42-2 may be used to determine borderline minutia points. Furthermore, it should be appreciated that by effectively establishing an area within which the positions of minutia points may vary, the overlapping border regions 42-1 and 42-2 facilitate accounting for variances that may be introduced while capturing biometric data and thus facilitate increasing the accuracy of text-based biometric authentication as described herein.

In the exemplary embodiment, minutia point MP3 is located within the overlapping border region 42-1. Thus, to account for the possible positional variation of minutia point MP3, in the exemplary embodiment minutia point MP3 is considered to have two positions within the grid 36. That is, the minutia point MP3 is considered to be positioned in adjacent cells 40-1 and 40-2, and is described using words derived from adjacent cells 40-1 and 40-2. Specifically, the position of minutia point MP3 is described with the words R21R22C6C7 R22R23C6C7. Minutia point MP1 is located within the overlapping border region 42-2, and is also considered to have two positions within the grid 36. That is, minutia point MP1 is considered to be positioned in adjacent cells 40-3 and 40-4, and is described with words derived from cells 40-3 and 40-4. Specifically, the position of minutia point MP1 is described with the words R22R23C8C9 R22R23C9C10. It should be understood that multiple words may constitute a sentence. Thus, because the words describing the positions of the minutia points MP1 and MP3 constitute multiple words, the words describing the positions of the minutia points MP1 and MP3 are sentences.

It should be understood that the borderline minutia points MP1 and MP3 as described in the exemplary embodiment are positioned within overlapping border regions 42-2 and 42-1, respectively, and thus are described with words derived from two different cells 40. However, it should be appreciated that in other embodiments, borderline minutia points may be located at an intersection of different overlapping border regions, such as at the intersection of overlapping border regions 42-1 and 42-2. Such borderline minutia points located at the intersection of two different overlapping border regions are considered to have four different cell positions within the grid 36, and are described with words derived from the four different cells.

Although the exemplary embodiment is described as using an angle θ1 of one degree, it should be appreciated that in other embodiments the angle θ1 may be any angle that is considered to define an overlapping border region large enough to capture likely borderline minutia points. Moreover, in other embodiments, instead of rotating the radial line R22 by the angle θ1 to define the overlapping border region 42-1, the radial line R22 may be offset to each side by a predetermined perpendicular distance, adequate to capture likely borderline minutia points, to define the overlapping border region 42-1. It should also be appreciated that although the exemplary embodiment is described using only one overlapping border region 42-1 for one radial line R22, and only one overlapping border region 42-2 for one circle C9, in other embodiments overlapping border regions may be positioned about each radial line Rj and each circle Ci, or any number of radial lines Rj and circles Ci that facilitates deriving words for borderline minutia points as described herein.

In the exemplary embodiment, the words are defined such that the radial lines Rj are expressed first in sequentially increasing order, followed by the circles Ci which are also expressed in sequentially increasing order. It should be appreciated that in other embodiments the radial lines Rj and the circles Ci may be expressed in any order. Moreover, it should be appreciated that although the exemplary embodiment expresses the location of minutia points MPn in alphanumeric words, in other embodiments the words may be expressed in any manner, such as, but not limited to, only alphabetic characters and only numeric characters, that facilitates authenticating the identity of an individual as described herein.

Figure 6:
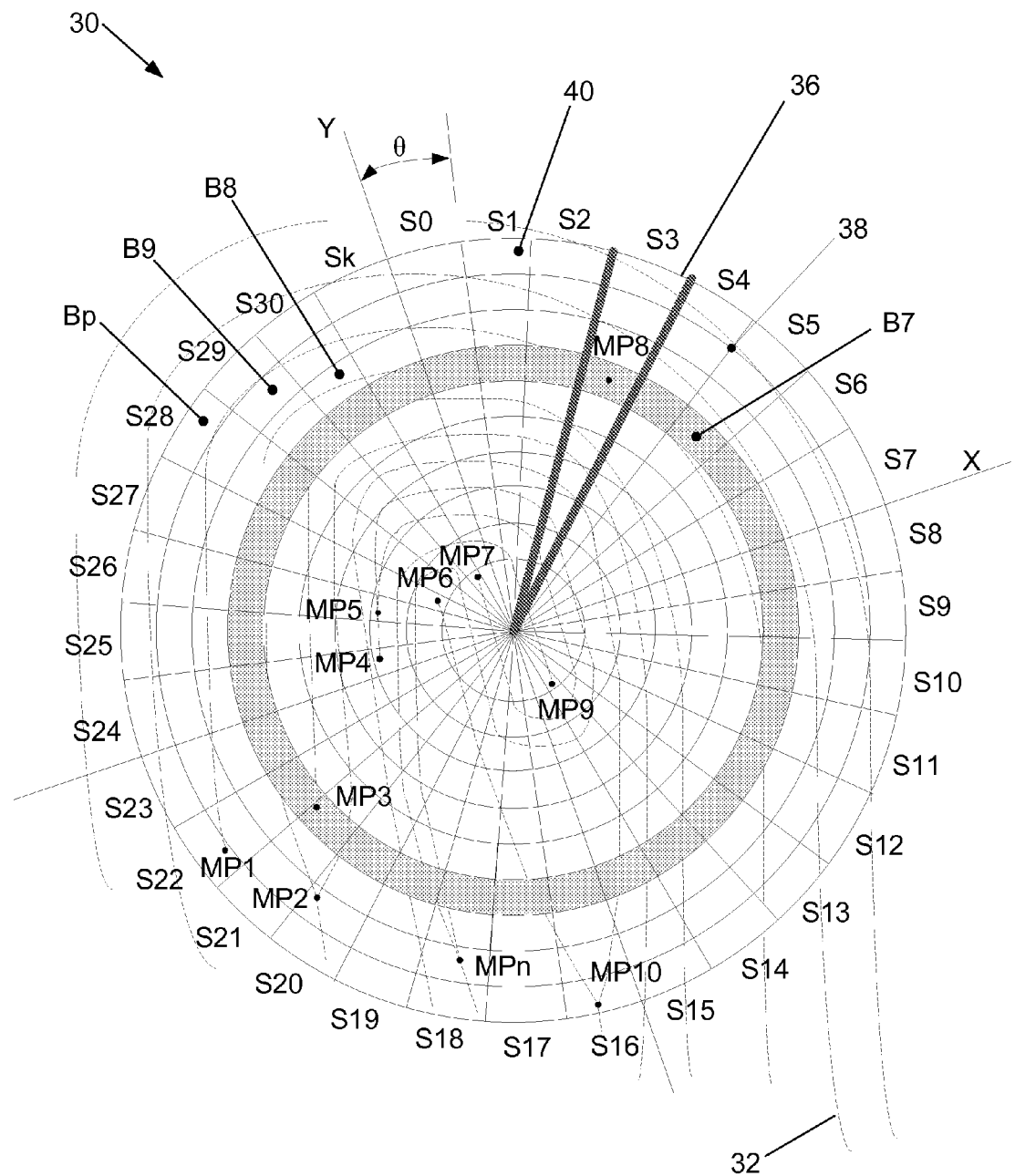
FIG. 6 is the plan view of the exemplary fingerprint image and radial grid as shown in FIG. 4 and is for determining alternative exemplary words from biometric data.

The information shown in FIG. 6 is the same information shown in FIG. 4, but shown in a different format, as described in more detail below. As such, geometric and mathematical relationships illustrated in FIG. 6 that are identical to geometric and mathematical relationships illustrated in FIG. 4, are identified using the same reference numerals used in FIG. 4.

FIG. 6 is the plan view of the exemplary fingerprint image 30 and radial grid 36 as shown in FIG. 4, and is for determining alternative exemplary words from captured biometric data. In this alternative exemplary embodiment, each adjacent pair of the radial lines Rj defines a sector Sk, and each adjacent pair of circles Ci defines a concentric band Bp. It should be appreciated that the designations "k" and "p" as used in conjunction with the sectors Sk and concentric bands Bp, respectively, are intended to convey that any number "k" of sectors Sk and any number "p" of concentric bands Bp may be used that facilitates authenticating the identity of an individual as described herein.

Coordinates based on the superimposed Cartesian coordinate system are computed for each intersection 38 and for each minutia point MPn to determine the position of each minutia point MPn relative to the radial grid 36. However, in contrast to the exemplary embodiment described with reference to FIG. 4, in this alternative exemplary embodiment, the coordinates of each minutia point MPn are compared against the coordinates of the intersections 38 to determine a corresponding sector Sk and a corresponding intersecting concentric band Bp that contain each minutia point MPn. It should be appreciated that each sector Sk and concentric band Bp designation describes a cell 40. For example, by comparing the coordinates of the minutia point MP8 against the coordinates 38, it is determined that the sector S3 and the concentric band B7 intersecting with sector S3, contain the minutia point MP8. By virtue of being contained in sector S3 and concentric band B7, the position of minutia point MP8 may be expressed in an alphanumeric word using sector Sk and concentric band Bp designations derived from the radial grid 36. Specifically, the position of the minutia point MP8 may be expressed with the word S3B7. Consequently, the position of each one of the minutia points MPn may be described in words derived from a corresponding sector Sk and concentric band Bp. As such, it should be understood that superimposing the radial grid 36 on the biometric image 30 facilitates converting the minutia points MPn into a vocabulary of alphanumeric words different from the vocabulary of the exemplary embodiment.

By using the radial grid 36 as described in this alternative exemplary embodiment, an algorithm is executed that converts captured biometric data into words, included in the different vocabulary of words, which may be used as the basis for authenticating the identity of an individual. Thus, by virtue of executing the algorithm of the alternative exemplary embodiment, words are generated that map to the different vocabulary.

In this alternative exemplary embodiment borderline minutia points such as MP1 and MP3 are also considered to have two positions within the grid 36. Thus, in this alternative exemplary embodiment, borderline minutia point MP1 is described with the words S22B9 S22B10 and borderline minutia point MP3 is described with the words S21B7 S22B7.

In this alternative exemplary embodiment, the words are defined such that the sectors Sk are expressed first and the concentric bands Bp are expressed second. However, it should be appreciated that in other embodiments the sectors Sk and the concentric bands Bp may be expressed in any order that facilitates authenticating the identity of an individual as described herein.

It should be appreciated that in yet other exemplary embodiments after obtaining the word for each cell 40, the words may be simplified, or translated, to correspond to a single cell number. For example, the word S0B0 may be translated to correspond to cell number zero; S1B0 may be translated to correspond to cell number one; S2B0 may be translated to correspond to cell number two; S31B0 may be translated to correspond to cell number 31; and, S0B1 may be translated to correspond to cell number 32. Thus, the words S0B0, S1B0, S2B0, S31B0 and S0B1 may be represented simply as single cell numbers 0, 1, 2, 31 and 32, respectively.

In this alternative exemplary embodiment the words describing the positions of minutia points MP1 and MP3 are sentences. Additionally, it should be appreciated that when the fingerprint image 30 includes a plurality of minutia points MPn, words corresponding to the minutia points may be sequentially positioned adjacent each other to form sentences. Such sentences may be generated, for example, by combining words that are nearest to the origin of the Cartesian co-ordinate system, starting with word S0B0, and proceeding clockwise and outwards to end at the word SkBp. However, in other embodiments the words are not required to be positioned sequentially, and may be positioned in any order to form a sentence that facilitates authenticating the identity of an individual as described herein.

Although this alternative exemplary embodiment includes the same radial grid 36 superimposed on the same biometric image 30 as the exemplary embodiment, it should be appreciated that the same radial grid 36 may be used to generate many different vocabularies in addition to those described herein. Moreover, although both of the exemplary embodiments described herein use the same radial grid 36 to generate different vocabularies, it should be appreciated that in other embodiments any other medium that establishes a positional relationship with biometric features of a desired biometric type may be used as a conversion algorithm for generating at least one vocabulary of words that describes the positions of the biometric features. Such mediums include, but are not limited to, rectangular grids, triangular grids, electronic models and mathematical functions. Furthermore, it should be appreciated that different vocabularies generated from different mediums may be combined to yield combined, or fused, vocabularies for the same biometric type and for different biometric types.

In the exemplary embodiments described herein the grid 36 is used to generate words that map to a corresponding vocabulary. Moreover, the grid 36 may be used to generate many words that each map to a same or different vocabulary. Furthermore, it should be understood that any other medium that establishes a positional relationship with biometric features may be used for generating words that each map to the same or different vocabulary.

Using the grid 36 to generate a vocabulary of words as described in the exemplary embodiments, effectively executes an algorithm that generates a vocabulary of words for use in authenticating the identity of individuals based on captured biometric data. However, it should be appreciated that in other embodiments other known algorithms, or classification algorithms, may be used to convert biometric features into words and thus generate additional alternative vocabularies. Such other known algorithms may convert biometric features into words by analyzing captured biometric data and classifying the captured biometric data into one or more finite number of groups. Such known classification algorithms include, but are not limited to, a Henry classification algorithm. The Henry classification algorithm examines a fingerprint global ridge pattern and classifies the fingerprint based on the global ridge pattern into one of a small number of possible groups, or patterns.

Consequently, in yet another alternative exemplary embodiment, another vocabulary of alphanumeric words may be generated by mapping each Henry classification pattern to a corresponding word included in a vocabulary defined for the Henry classification algorithm. For example, an arch pattern in the Henry classification algorithm may be mapped, or assigned, the corresponding word "P1," and a left loop pattern may be mapped, or assigned, the corresponding word "P2." It should be appreciated that in other embodiments, vocabularies of words and sentences may be established for any classification algorithm, thus facilitating use of substantially all known classification algorithms to authenticate the identity of individuals as described herein. It should be appreciated that other classification algorithms may rely on distances between groups or bins. In such classification algorithms, a lexicographic text-encoding scheme for numeric data that preserves numeric comparison operators may be used. Such numerical comparison operators include, but are not limited to, a greater than symbol (>), and a less than symbol (<). Further examples of fingerprint classification techniques that could be utilized using this approach include, but are not limited to, ridge flow classification, ridge flow in a given fingerprint region, ridge counts between minutiae points, lines between minutiae points, and polygons formed between minutiae points.

As discussed above, using the grid 36 as described in the exemplary embodiments effectively constitutes executing an algorithm that generates a vocabulary of words that can be independently used for biometrically authenticating individuals, and that generates many words that each map to a same or different vocabulary. It should also be appreciated that other algorithms may be used to convert biometric features into words to generate vocabularies of words for different biometric features of the same biometric type that may be independently used for authentication. Such other algorithms may also generate words that each map to the same or different vocabulary.

In yet another alternative embodiment, another algorithm may generate an additional vocabulary of words and sentences derived from the overall ridge pattern of a fingerprint instead of from fingerprint ridge endings and ridge bifurcations. Combining, or fusing, vocabularies that include words for the same biometric type, but for different biometric features, provides a larger amount of information that can be used to generate more trustworthy authentication results. Thus, it should be appreciated that by combining or fusing vocabularies, additional new vocabularies representing a same biometric type and different biometric features may be generated such that different words, from the combined vocabulary, representing the same biometric type may be used to generate more trustworthy authentication results. For example, when authenticating the identity of an individual on the basis of fingerprint biometric data, the identity may be authenticated using appropriate words from a vocabulary derived from fingerprint ridge endings and ridge bifurcations, and words from another vocabulary derived from the overall ridge pattern of the fingerprint. It should be appreciated that authenticating the identity of an individual using different words from a combined vocabulary representing the same biometric type and different biometric features facilitates increasing the level of trust in the authentication results. It should be understood that by virtue of generating a vocabulary of words each algorithm also defines the vocabulary of words. Moreover, it should be appreciated that each different algorithm generates and defines a different vocabulary of words.

The exemplary embodiments described herein use algorithms to convert biometric features of fingerprints into words. Such words are included in the vocabularies of words generated by respective algorithms. However, it should be appreciated that in other embodiments different algorithms may be used to convert biometric features, of any desired biometric type, into words. These words are also included in the vocabularies of words generated by the respective different algorithms. For example, a first algorithm may convert biometric features of the iris into words included in a first vocabulary of words generated by the first algorithm, and a second algorithm, different than the first algorithm, may convert biometric features of the voice into words included in a second vocabulary of words generated by the second algorithm. It should be understood that an additional third vocabulary of words including the first and second vocabularies may be generated by combining, or fusing, the first and second vocabularies. Combining, or fusing, vocabularies that define words for different biometric types also provides a larger amount of information that can be used to generate more trustworthy authentication results. Thus, it should be appreciated that by combining or fusing vocabularies, additional new vocabularies representing different biometric types may be generated such that different words, from the combined vocabulary, representing different biometric types may be used to generate more trustworthy authentication results. For example, when authenticating the identity of an individual on the basis of iris and voice biometric data, the identity may be authenticated using appropriate words from the first vocabulary and appropriate words from the second vocabulary. It should be appreciated that authenticating the identity of an individual using different words from a fused vocabulary representing different biometric types facilitates increasing the level of trust in the authentication results.

When a plurality of biometric types are used for authentication, configurable authentication policies and rules included in the GFM application may be configured to weight some biometric types differently than others. Authentication based on certain biometric types is more trustworthy than authentication based on other biometric types. For example, a biometric authentication result based on biometric data captured from an iris may often be more trustworthy than an authentication result based on biometric data captured from a fingerprint. In order to account for the different levels of trust in the authentication results, each biometric type may be weighted differently. For example, in a fused vocabulary certain words may be directed towards a fingerprint of an individual and other words may be directed towards an iris of the same individual. Because authentication based on an iris may be considered more trustworthy, during authentication the iris words are given greater emphasis, or are more heavily weighted, than the fingerprint words. It should be appreciated that weighting biometric data of one biometric type differently than biometric data of another biometric type by emphasizing the biometric data of the one biometric type more than the biometric data of the other biometric type may yield more trustworthy authentication results.

Words in fused vocabularies may also be weighted due to the source of the original words before fusion. For example, words from the vocabulary generated using the method of the exemplary embodiment may be weighted more heavily than words from the vocabulary generated using the alternative exemplary embodiment. Different types of words generated from the same biometric type may also be weighted differently. For example, elderly individuals may be associated with certain types of words that identify them as elderly. Weighting such certain types of words more heavily during biometric authentication may facilitate reducing the time required for authentication by reducing the number of comparisons against those identity records having the same certain types of words.

It should be understood that converting captured biometric data into words, as described herein, facilitates enabling the server system 12 to implement matching algorithms using industry standard search engines. Moreover, it should be understood that performing industry standard searches based on such words facilitates enabling the server system 12 to generate and return results to the client systems 14 more efficiently and more cost effectively than existing biometric systems and methods, and facilitates reducing dependence on expensive, specialized, and proprietary biometric matchers used in existing biometric authentication systems and methods.

FIG. 7 is an exemplary identity record 44 including biographic data 46 collected from an individual, the type 48 of biometric data obtained from the individual, and words 50 for each biometric type 48. In order to authenticate the identity of individuals with the server system 12, the biographic data 46 and biometric data of a plurality of individuals should be collected and stored in the server system 12 prior to authentication. The words 50 should also be determined and stored in the system 12 prior to authentication. Obtaining and storing such data prior to authentication is generally known as enrollment. In the exemplary embodiment at least the biographic data 46 and words 50 for each individual enrolled in the server system 12 are included in a corresponding identity record stored in the server system 12. The identity records 44 may also include data such as, but not limited to, the obtained biometric data and biometric feature templates. Moreover, it should be appreciated that the identity records 44 stored in the server system 12 constitute a gallery of identity record data.

In the exemplary embodiment, during enrollment each individual manually types the desired biographic data 46 into the keyboard associated with one of the client systems 14. In order to properly capture desired biometric data, the client systems 14 are configured to include enrollment screens appropriate for capturing the desired biometric data, and are configured to include the biometric capture devices 28 for capturing the desired biometric data submitted by the individuals. However, in other embodiments, the biographic data 46 and biometric data may be obtained using any method that facilitates enrolling individuals in the system 12. Such methods include, but are not limited to, automatically reading the desired biographic data 46 and biometric data from identity documents and extracting the desired biographic data 46 and biometric data from other databases positioned at different locations than the client system 14. Such identity documents include, but are not limited to, passports and driver's licenses. It should be understood that enrollment data of individuals constitutes at least the biographic data 46 and the words 50 derived from the desired biometric data.

The term "biographic data" 46 as used herein includes any demographic information regarding an individual as well as contact information pertinent to the individual. Such demographic information includes, but is not limited to, an individual's name, age, date of birth, address, citizenship and marital status. Moreover, biographic data 46 may include contact information such as, but not limited to, telephone numbers and e-mail addresses. However, it should be appreciated that in other embodiments any desired biographic data 46 may be required, or, alternatively, in other embodiments biographic data 46 may not be required.

After obtaining the desired biometric data during enrollment, the desired biometric data is converted into words 50 with a conversion algorithm. In the exemplary embodiment, the desired biometric data is the left index finger. Thus, during enrollment biometric data of the left index finger is captured and is converted into a corresponding text string 50, or words 50, using the algorithm of the exemplary embodiment as described with respect to FIG. 4. It should be understood that each text string 50 constitutes a word 50 that facilitates textually describing biometric features included in captured biometric data. Because the words 50 are generated from biometric data captured during enrollment, the words 50 may also be referred to as enrollment biometric words 50. Thus, each of the identity records 44 includes enrollment biometric words 50 of an individual determined during enrollment.

It should be appreciated that the words R22R23C8C9 R22R23C9C10 and R21R22C6C7 R22R23C6C7 describe minutia points MP1 and MP3, respectively. Moreover, it should be appreciated that in other embodiments, words 50 describing minutia points of the left index finger may include a prefix, such as, but not limited to, FLI which abbreviates Finger—Left Index. Likewise, words 50 describing minutia points of the right index finger may include a prefix such as, but not limited to, FRI which abbreviates Finger—Right Index. Thus, the word 50 describing exemplary minutia point MP1 may be represented as FLIR22R23C8C9 FLIR22R23C9C10.

Although the words 50 are described in the exemplary embodiment as being generated from biometric data captured during enrollment, in other embodiments additional words 50, derived from biometric data obtained after enrollment, may be added to an identity record 44 after enrollment. Moreover, in other embodiments the words 50 may include words 50 generated from different types 48 of biometric data such as, but not limited to, face, iris and voice biometric data. Words 50, corresponding to the different types of biometric data, are generally generated by different algorithms. Words 50 generated by different algorithms for a same biometric type may also be included in the identity records 44.

Although the identity records 44 are stored as record data in the server system 12 in the exemplary embodiment, it should be appreciated that in other embodiments the identity records 44 may be stored in any form such as, but not limited to, text documents, XML documents and binary data.

The information shown in FIG. 8 is substantially the same information shown in FIG. 7, but includes words 50 that were converted using the radial grid 36 as described herein in the alternative exemplary embodiment associated with FIG. 6. As such, information illustrated in FIG. 8 that is identical to information illustrated in FIG. 7, is identified using the same reference numerals used in FIG. 7.

FIG. 8 is an alternative exemplary identity record 44 including biographic data 46, types of biometric data 48 and words 50.

Figure 9:
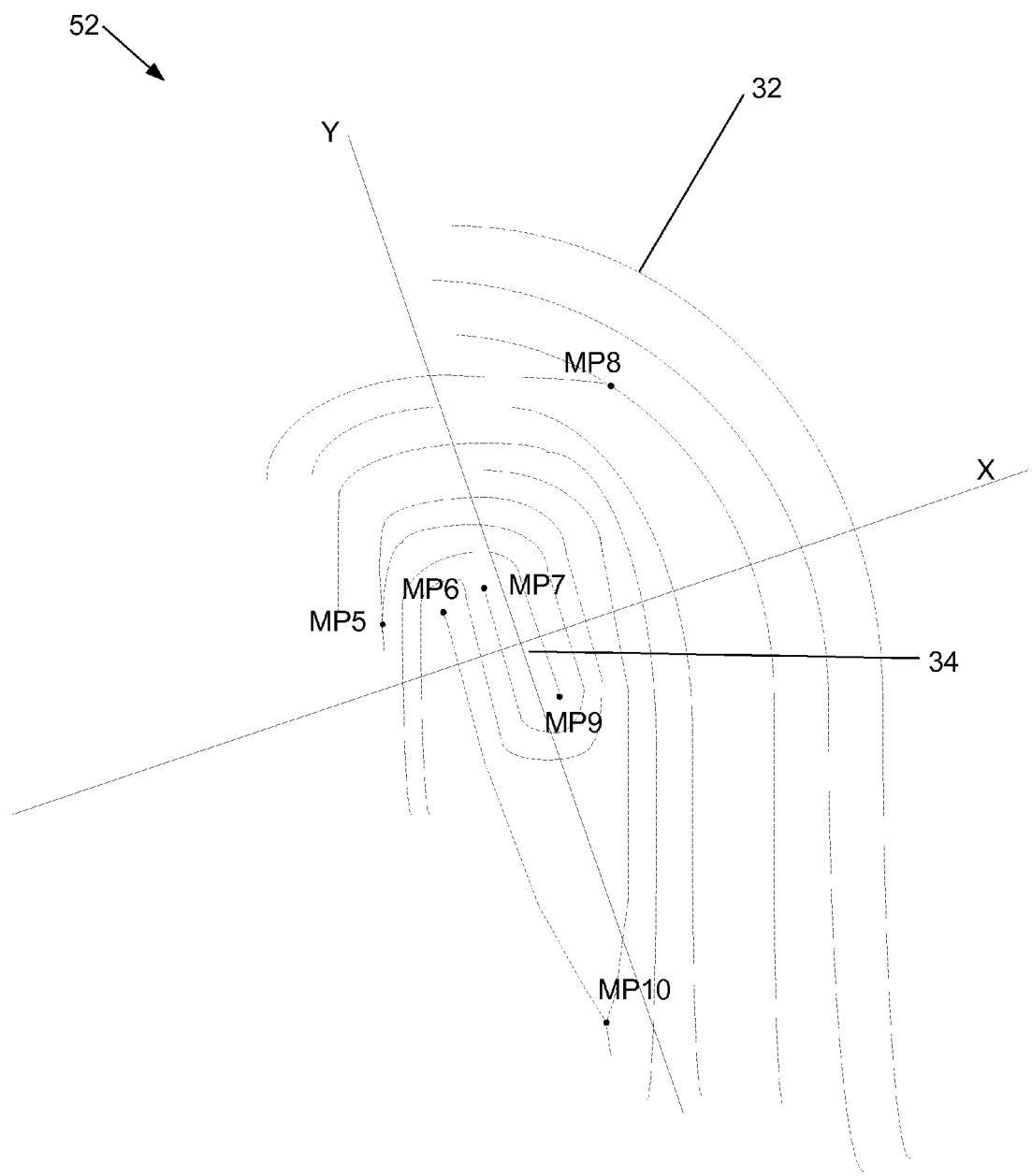
FIG. 9 is an exemplary partial fingerprint image of processed biometric data partially captured during authentication.

The information shown in FIG. 9 is similar to the information shown in FIG. 2, but includes a partial left index fingerprint image instead of a full left index fingerprint image, as described in more detail below. As such, the information illustrated in FIG. 9 that is identical to information illustrated in FIG. 2, is identified using the same reference numerals used in FIG. 2.

FIG. 9 is an exemplary partial fingerprint image 52 of processed biometric data partially captured during authentication. Specifically, the partial fingerprint image 54 is of a left index fingerprint captured from an individual during authentication in the exemplary embodiment. It should be understood that the partial fingerprint image 52 and the fingerprint image 30 are from the same finger of the same person. However, the partial fingerprint image 52 does not contain the same number of minutia points MPn as the fingerprint image 30. Moreover, it should be understood that such a partial print is generally used as the basis for authenticating the identity of an individual during authentication. Although the partial fingerprint image 52 is of a left index fingerprint, it should be appreciated that in other embodiments fingerprints of varying quality may be obtained from the same person. Such fingerprints include, but are not limited to, rotated fingerprints. It should be appreciated that in the exemplary embodiment, all fingerprints are to be rotated to have an orientation reconciled with that of a corresponding record fingerprint prior to proper authentication.

Figure 10:
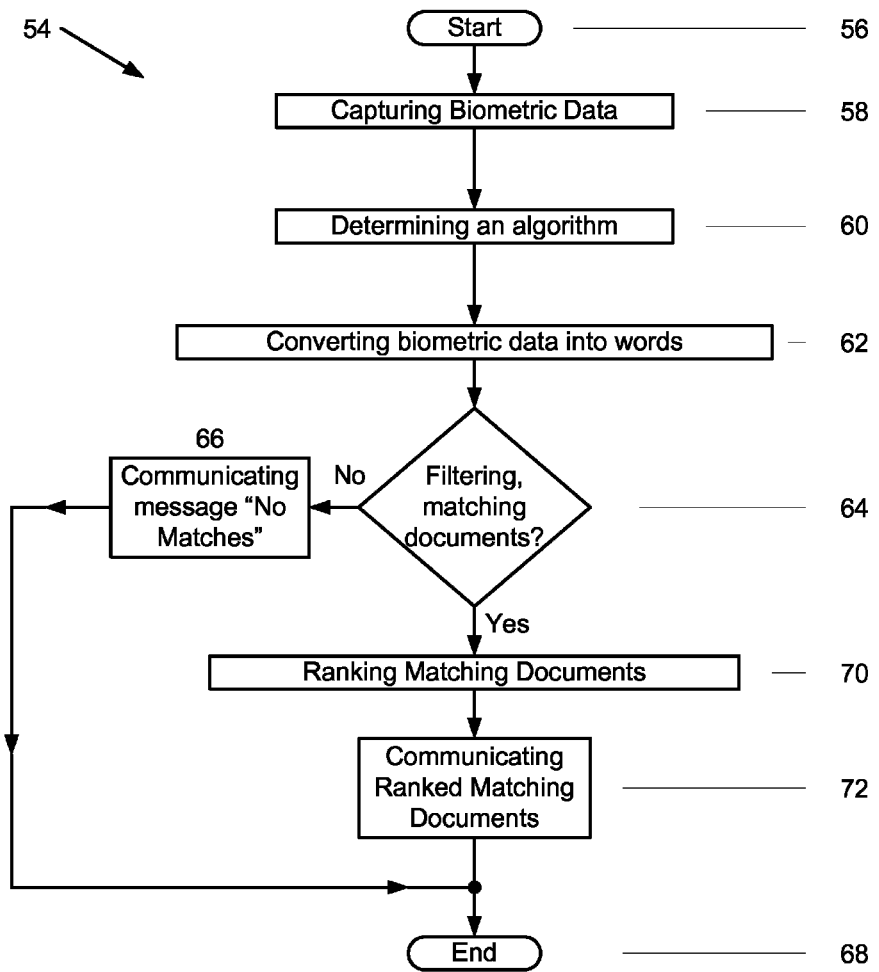
FIG. 10 is a flowchart illustrating an exemplary method for authenticating the identity of an individual using text-based biometric authentication.

FIG. 10 is a flowchart 54 illustrating an exemplary method for authenticating the identity of an individual using text-based biometric authentication. The method starts 56 by capturing biometric data 58 corresponding to a desired biometric type from the individual, and processing the captured biometric data into a biometric feature template. In the exemplary method, the desired biometric type is the left index finger. Thus, the data included in the biometric feature template constitutes minutia points MPn of the left index finger. However, in other embodiments biometric data of any biometric type, or any combination of the same or different biometric types, may be captured and processed into a plurality of corresponding biometric feature templates. Such biometric types include, but are not limited to, face, finger, iris and voice. Thus, it should be understood that the captured biometric data may be processed into at least one biometric feature template and that the at least one biometric feature template includes at least one feature.

The method continues by determining 60 one of a plurality of algorithms for converting biometric features of the desired biometric type into words. The server system 12 determines the one conversion algorithm in accordance with authentication policies stored therein. In the exemplary method the same conversion algorithm is used for converting biometric feature template data into words as was used during enrollment. Although the one conversion algorithm is determined using authentication policies in the exemplary embodiment, it should be understood that in other embodiments the server system 12 may not have authentication policies stored therein. In such other embodiments a single conversion algorithm is stored in the server system and is determined to be the algorithm used for converting biometric features into words.

Next, the method continues by converting 62 the data included in the biometric feature template into at least one word using the determined conversion algorithm and including the at least one word in a probe generated by the system 12. Words generated as a result of converting the biometric feature template data during authentication are authentication words. Although biometric data of one biometric type is captured in the exemplary embodiment, it should be appreciated that in other embodiments biometric data may be captured for a plurality of different biometric types. In such other embodiments the captured biometric data for each biometric type is processed into a respective biometric feature template, and a conversion algorithm is determined for each of the different biometric types such that the data included in each of the respective biometric feature templates may be converted into at least an authentication word. The authentication words are included in the probe.

After including the authentication words in the probe 62, the method continues by filtering 64 with the generic filtering module (GFM) application by comparing the probe against the gallery. Specifically, the GFM application compares 64 the authentication words included in the probe against the enrollment biometric words 50 included in each of the identity records 44 to determine potential matching identity records. It should be appreciated that a list of potential matching identity records is generated by the GFM application according to the similarity between the probe and the identity records 44.

In the exemplary embodiment, when a comparison does not result in a match between at least one authentication word in the probe and at least one enrollment biometric word 50 in a given identity record 44, the given identity record 44 is discarded, or filtered out. Moreover, when a comparison does not result in a match between at least one authentication word in the probe and at least one enrollment biometric word 50 in any of the identity records 44, the method continues by communicating 66 a negative result to the client system 14. The client system 14 then displays a message indicating "No Matches," and the method ends 68. Although the client system 14 displays a message indicating "No Matches" when a comparison does not result in a match in the exemplary embodiment, it should be appreciated that in other embodiments the client system may communicate the negative result in an alternative message or in any manner, including, but not limited to, emitting a sound and sending a communication to another system or process.

However, when at least one authentication word included in the probe matches at least one enrollment biometric word included in at least one identity record 44, processing continues by identifying the at least one identity record 44 containing the at least one matching enrollment biometric word as a potential matching identity record. After comparing 68 the probe against all of the identity records 44 in the gallery, processing continues by generating the list of potential matching identity records from the potential matching records. The list of potential matching identity records includes a listing of identity record identifiers that each correspond to a different one of the potential matching identity records. In other embodiments the list may include any data that facilitates identifying the potential matching identity records.

Next, processing continues by ranking 70 the potential matching identity records included in the list in accordance with the authentication policies and rules included in the server system 12. For example, the authentication policies and rules may rank the potential matching identity records according to the number of enrollment biometric words contained therein that match against authentication words in the probe. Thus, the greater the number of matching enrollment biometric words contained in a potential matching identity record, the more similar a potential matching identity record is to the probe. Consequently, the more similar a potential matching identity record is to the probe, the higher the ranking of the potential matching identity record in the list. It should be understood that the most highly ranked potential matching identity records in the list are most likely to be true matching identity records that may be used to authenticate the identity of the individual. After ranking the potential matching identity records 70 in the list, the list of ranked potential matching identity records is stored in the server system 12. Processing continues by communicating 72 the list of ranked potential matching identity records and the ranked matching identity records themselves to a client system 14 for any desired use by an entity associated with the client system 14. For example, the entity may use the ranked potential matching identity records to authenticate the individual. Next, processing ends 68.

Although the exemplary method determines a potential matching identity record when at least one authentication word in a probe matches at least one enrollment biometric word in an identity record 44, it should be appreciated that in other embodiments any other matching criteria may be established to determine a potential matching identity record that facilitates authenticating the identity of an individual as described herein. Such other criteria include, but are not limited to, determining a potential matching identity record when two or more words match between a probe and an identity record 44. Although the GFM application ranks the potential matching identity records according to the number of matching words contained therein in the exemplary method, it should be appreciated that in other embodiments the GFM application may rank the potential matching identity records in accordance with any policy, or may rank the potential matching identity records in any manner, that facilitates ranking the potential matching identity records based on similarity with the probe.

Figure 11:
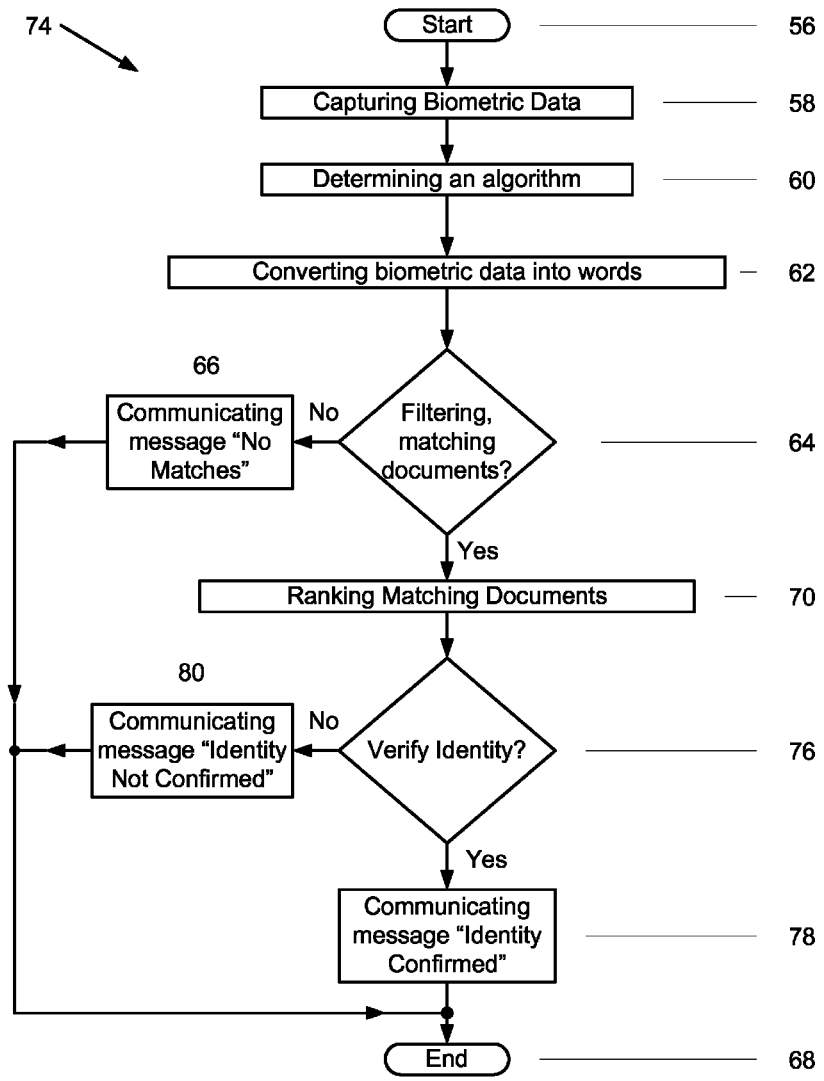
FIG. 11 is a flowchart illustrating an alternative exemplary method for authenticating the identity of an individual using text-based biometric authentication.

The information shown in FIG. 11 is the same information shown in FIG. 10 as described in more detail below. As such, operations illustrated in FIG. 11 that are identical to operations illustrated in FIG. 10, are identified using the same reference numerals used in FIG. 10.

FIG. 11 is a flowchart 74 illustrating an alternative exemplary method for authenticating the identity of an individual using text-based biometric authentication. This alternative embodiment is similar to that shown in FIG. 10. However, instead of communicating the list and potential matching identity records to an entity after ranking the potential matching identity records 70, the server system 12 continues processing by verifying the identity 76 of the individual by conducting a 1:1 verification matching transaction. More specifically, the server system 12 performs a subsequent process by conducting a 1:1 verification matching transaction between the biometric feature template and corresponding biometric feature templates included in each of the ranked potential matching identity records. Thus, the server system 12 generates highly trusted authentication results. It should be appreciated that in other embodiments any biographic data 46, any words 50, or any combination of biographic data 46 and words 50, included in each of the ranked potential matching identity records may be used to verify the identity 76 of the individual. When the biometric feature template matches the corresponding biometric feature template of at least one of the ranked potential matching identity records, the identity of the individual is verified 76, and a positive result is communicated 78 to the client system 14 and displayed for use by the entity associated with the client system 14. Specifically, the positive result is a message that indicates "Identity Confirmed." Next, processing ends 68.

However, when the identity of the individual is not verified 76, a negative result is output 80 to the client system 14. Specifically, the client system 14 displays the negative result as a message that indicates "Identity Not Confirmed." Next, processing ends 68.

It should be appreciated that comparing the authentication words included in a probe against the enrollment biometric words included in the identity records constitutes an initial filtering process because the number of identity records to be analyzed in a subsequent 1:1 verification transaction is quickly reduced to a list of potential matching identity records. By thus quickly reducing the number of identity records, the initial filtering process facilitates reducing the time required to biometrically authenticate individuals. Thus, it should be understood that by filtering out non-matching identity records to quickly generate the list of potential matching identity records, and by generating highly trusted authentication results 76 from the list of potential matching identity records, a method of text-based biometric authentication is provided that facilitates accurately, quickly, and cost effectively authenticating the identity of individuals.

Although the probe includes authentication words in the exemplary methods described herein, it should be appreciated that in other methods the probe may include a combination of biographic words and authentication words. In such other methods, the biographic words constitute words representing any biographic data such as, but not limited to, words describing an individual's name, words describing an individual's date of birth, and alphanumeric words describing an individual's address. The biographic data 46 may also be included in the identity records 44 as biographic words.

It should be understood that by virtue of including the combination of biographic words and authentication words in the probe, the whole identity of an individual may be used for authentication. Moreover, it should be understood that using the whole identity of an individual for authentication facilitates increasing confidence in authentication results. Authentication based on the whole identity of an individual as described herein is unified identity searching. Thus, including the combination of biographic words and authentication words in the probe facilitates enabling unified identity searching and facilitates enhancing increased confidence in authentication results. It should be appreciated that in unified identity searching, identity records are determined to be potential matching identity records when at least one of the biographic words included in the probe, or at least one of the authentication words included in the probe, matches at least one of the biographic words or one of the enrollment biometric words, respectively, included in an identity record. Furthermore, when unified identity matching is implemented, a list of potential matching identity records is generated and processed as described herein in the exemplary method with regard to the flowchart 54.

In the exemplary embodiments described herein, biometric authentication based on words is used to facilitate authenticating the identities of individuals. More specifically, a determined algorithm converts biometric feature template data into authentication words. The authentication words are used in an initial filtering process to generate a list of ranked potential matching identity records. The list of ranked potential matching identity records and the identity records themselves are communicated to an entity for any use desired by the entity. Instead of communicating the list to an entity, a subsequent process may be conducted by performing a 1:1 verification matching transaction between the biometric feature template data included in a probe against each of the ranked potential matching identity records to authentication the individual. Because the text-based searching of the initial filtering process is more efficient, less time consuming and less expensive than image based searching, the identity of an individual is facilitated to be authenticated quickly, accurately and cost effectively. Moreover, it should be appreciated that conducting text-based searching as described herein, facilitates leveraging industry standard search engines to facilitate increasing the efficiency of biometric authentication, to facilitate reducing the time and costs associated with such authentications, and to facilitate easier modification of known biometric authentication search engines such that known search engines may operate with other authentication systems. Furthermore, text-based searching as described herein facilitates enhancing continued investment in search engine technology.

Exemplary embodiments of methods for authenticating the identity of an individual using biometric text-based authentication techniques are described above in detail. The methods are not limited to use as described herein, but rather, the methods may be utilized independently and separately from other methods described herein. Moreover, the invention is not limited to the embodiments of the method described above in detail. Rather, other variations of the method may be utilized within the spirit and scope of the claims.

Furthermore, the present invention can be implemented as a program stored on a computer-readable recording medium, that causes a computer to execute the methods described herein to authenticate the identity of an individual using words derived from biometric feature templates. The program can be distributed via a computer-readable storage medium such as, but not limited to, a CD-ROM.

While the invention has been described in terms of various specific embodiments, those skilled in the art will recognize that the invention can be practiced with modification within the spirit and scope of the claims.

What is claimed is:

1. A method of text-based biometric authentication comprising:
    capturing biometric data for a desired biometric type from an individual using a client system;
    communicating the captured biometric data to a server system, the server system having identity records stored therein, each identity record including enrollment biometric words that represent a plurality of different biometric types;
    determining an algorithm for converting the biometric data into authentication words;
    converting the captured biometric data into authentication words using the algorithm;
    combining the authentication words into a sentence;
    comparing the sentence against each enrollment biometric word in each identity record;
    identifying at least one of the identity records as a potential matching identity record when at least part of the sentence matches at least one of the enrollment biometric words included in the at least one identity record; and
    generating a list of potential matching identity records.

2. A method of text-based biometric authentication in accordance with claim 1 further comprising:
    verifying the identity of the individual by conducting a 1:1 verification matching transaction between a captured biometric feature template generated from the captured biometric data and a corresponding biometric feature template included in each of the potential matching identity records; and
    communicating a positive result when the captured biometric feature template matches the corresponding biometric feature template of at least one of the potential matching identity records.

3. A method of text-based biometric authentication in accordance with claim 1, further comprising ranking the potential matching identity records in the list of potential matching identity records in accordance with authentication policies stored in the server system.

4. A method of text-based biometric authentication in accordance with claim 1, further comprising:
    mapping the authentication words and the enrollment biometric words generated from the desired biometric type to a first vocabulary; and mapping the enrollment biometric words generated from biometric types different than the desired biometric type to a fused vocabulary, the fused vocabulary being different than the first vocabulary.

5. A method of text-based biometric authentication in accordance with claim 1, further comprising adding additional authentication words to the identity record after enrolling the individual in the server system, the additional authentication words being combinable with the sentence.

6. A method of text-based biometric authentication in accordance with claim 1, said converting operation comprising:
  processing the captured biometric data into at least one biometric feature template such that the at least one biometric feature template includes a plurality of features; and
  converting each of the features into an authentication word.

7. A method of text-based biometric authentication in accordance with claim 1, further comprising enrolling a plurality of individuals in the server system, said enrolling operation comprising:
  collecting biographic data and capturing biometric data from a plurality of individuals, the captured biometric data corresponding to different biometric types;
  converting the biometric data of each of the individuals into enrollment biometric words; and
  storing the collected biographic data and the enrollment biometric words of each individual in a corresponding one of the identity records in the server system.

8. A method of text-based biometric authentication in accordance with claim 1, further comprising:
  combining biographic words associated with the individual with the sentence; and
  comparing the combination against each enrollment word and each biographic word in each identity record to provide unified identity searching.

9. A system for text-based biometric authentication comprising:
  a computer configured as a server, said server including at least a data base, said server being configured to store within said database at least one conversion algorithm and at least a gallery of data comprising identity records, each identity record including at least biographic data of an individual and enrollment biometric words of the individual, the enrollment biometric words being generated from a desired biometric type and from biometric types different than the desired biometric type; and
  at least one client system comprising at least a computer configured to communicate with said server, said client system being configured to at least capture biometric data for the desired biometric type from an individual, said server being further configured to
  convert the captured biometric data into authentication words by executing at least one conversion algorithm,
  combine the authentication words into a sentence,
  compare the sentence against each enrollment biometric word in each identity record,
  identify at least one of the identity records as a potential matching identity record when at least a part of the sentence matches at least one of the enrollment biometric words included in the at least one identity record, and
  generate a list of potential matching identity records.

10. A system for text-based biometric authentication in accordance with claim 9, said server being further configured to:
  map the authentication words and the enrollment biometric words generated from the desired biometric type to a first vocabulary; and
  map the enrollment biometric words generated from the biometric types different than the desired biometric type to a fused vocabulary, the fused vocabulary including a plurality of vocabularies.

11. A system for text-based biometric authentication in accordance with claim 9, said server being further configured to add additional authentication words to the identity record after enrolling the individual in the server system, the additional authentication words mapping to at least one vocabulary.

12. A system for biometric authentication in accordance with claim 9, said server being further configured to verify the identity of the individual by conducting a 1:1 verification matching transaction between a captured biometric feature template generated from the captured biometric data and a corresponding biometric feature template included in each of the potential matching identity records.

13. A system for biometric authentication in accordance with claim 12, said at least one client system being further configured to display an output communicating a positive result when the captured biometric feature template matches the corresponding biometric feature template of at least one of the potential matching identity records.

14. A system for biometric authentication in accordance with claim 9, said server being further configured to:
  process the captured biometric data into a biometric feature template; and
  convert data included in the biometric feature template into at least an authentication word.

15. A system for biometric authentication in accordance with claim 9, each authentication word being comprised of an alphanumeric text string that textually describes a biometric feature of the captured biometric data.

16. A system for biometric authentication in accordance with claim 9, wherein said server is further configured to:
  convert biometric data of each of the individuals obtained during enrollment into enrollment biometric words with the at least one conversion algorithm; and
  store the collected biographic data and the enrollment biometric words of each individual in a corresponding identity record in said data base.

17. A computer program recorded on a non-transitory computer-readable recording medium included in an authentication computer system for enabling authentication of individuals, the computer program being comprised of instructions, which when read and executed by the authentication computer system, cause the authentication computer system to perform at least the following operations:
  determine a plurality of algorithms, each of the algorithms being operable to convert biometric data of a corresponding biometric type captured from a user into a vocabulary of words;
  convert the captured biometric data for each biometric type into authentication words in accordance with the corresponding one of the algorithms;
  combine the authentication words into a sentence;
  compare the sentence against identity records, wherein each of the identity records includes enrollment biometric words of a corresponding individual and the enrollment biometric words and the authentication words represent a plurality of different biometric types;
  identify at least one of the identity records as a potential matching identity record when at least part of the sentence matches at least one of the enrollment biometric words included in the at least one identity record; and generating a list of potential matching identity records.

18. A computer program recorded on a non-transitory computer-readable recording medium in accordance with claim 17, further comprising instructions, which when read and executed by the authentication computer system, cause the authentication computer system to:

verify the identity of the individual by conducting a 1:1 verification matching transaction between a captured biometric feature template generated from biometric data captured from the individual and a corresponding biometric feature template included in each of the potential matching identity records; and communicate a positive result when the captured biometric feature template matches the corresponding biometric feature template of at least one of the potential matching identity records.

\* \* \* \* \*